United States Patent
Xu

(10) Patent No.: US 8,066,932 B2
(45) Date of Patent: Nov. 29, 2011

(54) PROCESS OF FABRICATING NANOFIBERS BY REACTIVE ELECTROSPINNING

(75) Inventor: Xiaoming Xu, Metairie, LA (US)

(73) Assignee: Board of Supervisors of Louisiana State Universtiy and Agricultural and Mechanical College, on behalf of The University of New Orleans, Baton Rouge, LA (US)

( * ) Notice: Subject to any disclaimer, the term of this patent is extended or adjusted under 35 U.S.C. 154(b) by 1231 days.

(21) Appl. No.: 10/570,561

(22) PCT Filed: Sep. 2, 2004

(86) PCT No.: PCT/US2004/028533
§ 371 (c)(1),
(2), (4) Date: Mar. 2, 2006

(87) PCT Pub. No.: WO2005/026398
PCT Pub. Date: Mar. 24, 2005

(65) Prior Publication Data
US 2007/0018361 A1  Jan. 25, 2007

Related U.S. Application Data

(60) Provisional application No. 60/500,591, filed on Sep. 5, 2003.

(51) Int. Cl.
*D06M 10/00* (2006.01)
*D06M 10/02* (2006.01)
*H05B 7/00* (2006.01)

(52) U.S. Cl. ..................... 264/444; 264/465

(58) Field of Classification Search .............. 264/444, 264/465
See application file for complete search history.

(56) References Cited

U.S. PATENT DOCUMENTS

| 6,106,913 A | 8/2000 | Scardino | 428/36.3 |
| 6,308,509 B1 | 10/2001 | Scardino et al. | 57/402 |
| 6,382,526 B1 | 5/2002 | Reneker et al. | 239/294 |
| 6,520,425 B1 | 2/2003 | Reneker | 239/294 |
| 6,753,454 B1 * | 6/2004 | Smith et al. | 602/41 |
| 2002/0192468 A1 * | 12/2002 | Choi | 428/392 |
| 2004/0241436 A1 * | 12/2004 | Hsieh et al. | 428/361 |
| 2005/0053782 A1 * | 3/2005 | Sen et al. | 428/364 |
| 2005/0067732 A1 * | 3/2005 | Kim et al. | 264/172.19 |
| 2007/0026069 A1 * | 2/2007 | Shastri et al. | 424/486 |

FOREIGN PATENT DOCUMENTS

WO   WO / 01/27365   4/2001

OTHER PUBLICATIONS

Baker, D.A. et al.,"Reactive routes to making modified nanofiber structures via electrospinning," *Polymer Preprints*, vol. 44, No. 2, pp. 118-119 (2003).

(Continued)

*Primary Examiner* — Leo B Tentoni
(74) *Attorney, Agent, or Firm* — John H. Rumels; Bonnie J. Davis

(57) ABSTRACT

Apparatus and methods for fabricating nanofibers by reactive electrospinning are described. An electrospinning process is coupled with an in-line reactor where chemical or photochemical reactions take place. This invention expands the application of the electrospinning and allows the production of nanofibers of crosslinked polymers and other new materials, such as gel nanofibers of ceramic precursors.

28 Claims, 11 Drawing Sheets

OTHER PUBLICATIONS

Dai, H. et al., "A novel method for preparing ultra-fine alumina-borate oxide fibres via an electrospinning technique," *Nanotechnology*, vol. 13, pp. 674-677 (2002).

Ding, B. et al, "Preparation and characterization of a nanoscale(vinyl alcohol) fiber aggregate produced by an electrospinning method," J. Poly. Sci. B: Poly. Phys., (2002), 40, 1261-1268.

Frenot, A. et al., "Polymer assembled by electrospinning," *Current Opinion in Colloid and Interface Science*, vol. 8, pp. 64-75 (2003).

Huang, Z. et al., "A review of polymer nanofibers by electrospinning and their application in nanocomposites," *Composites Science and Technology*, vol. 63, pp. 2223-2253 (2003).

Kasuga, T. et al., "Bioactive Glass-Ceramic Composite Toughened by Tetragonal Zirconia," CRC Handbook of Bioactive Ceramics, vol. 1, pp. 137-142 (1990).

Kokubo, Tadashi et al., "Novel bioactive materials with different mechanical properties," Biomaterials, vol. 24, pp. 2161-2175 (2003).

Larsen, G. et al., "A method for making inorganic and hybrid (organic / inorganic) fibers and vesicles with diameters in the submicrometer and micrometer range via sol-gel chemistry and electrically forced liquid jets," *J. Am. Chem. Soc.*, vol. 125, pp. 1154-1155 (2003).

Li, D. et al., "Electrospinning of polymeric and ceramic nanofibers as uniaxially aligned arrays," *Nano Letters*, vol. 3, pp. 1167-1171 (2003).

Li, D. et al., "Fabrication of titania nanofibers by electrospinning," *Nano Letters*, vol. 3, pp. 555-560 (2003).

Shao, C. et al., "A novel method for making silica nanofibres by using electrospan fibres of polyvinylalcohol/silica composite as precursor," *Nanotechnology*, vol. 13, pp. 635-637 (200.

Xu, X. et al., "Preparation of zirconia-based ceramics nanofibers by sol-gel electrospinning," *Polymeric Materials Science & Engineering*, vol. 91, pp. 517-518 (2004).

\* cited by examiner

PROCESS OF FABRICATING NANOFIBERS BY REACTIVE ELECTROSPINNING

The benefit of the 5 Sep. 2003 filing date of U.S. provisional patent application Ser. No. 60/500,591 is claimed under 35 U.S.C. § 119(e) in the United States, and is claimed under applicable treaties and conventions in all countries.

TECHNICAL FIELD

This invention pertains to nanofibers, and to apparatus and methods for producing nanofibers through the in-line coupling of electrospinning with chemical reactions, photochemical reactions, or both.

BACKGROUND ART

Nanofibers are thin small fibers, with typical diameters ranging from tens to hundreds of nanometers, up to about 1 micrometer. Nanofibers have been formed from polymers, carbon, and ceramic. Nanofibers have attracted great interest because of their extraordinarily high surface area and length-to-width ratio, as well as their unique physical and mechanical properties. Nanofibers are being used in such areas as filtration, fiber-reinforced nanocomposites, wound dressing, drug delivery, artificial organs, micro-electrical systems, and micro-optical systems. However, fabrication of nanofibers is very challenging due to their minute diameters. Traditional methods, such as formation in porous solids or at the step-edges of laminated crystals, are often ineffective and costly. An alternative method is electrostatic fiber formation or electrospinning. Electrospinning is a relatively simple and versatile method.

In electrospinning, a high voltage (e.g., ~3 to ~50 kV) is applied between a target (or collector) and a conducting capillary into which a polymer solution or melt is injected. The high voltage can also be applied to the solution or melt through a wire if the capillary is a nonconductor such as a glass pipette. The collector may be a metal plate or screen, a rotating drum, or even a liquid bath if the capillary is vertical. Initially the solution at the open tip of the capillary is pulled into a conical shape (the so-called "Taylor cone") through the interplay of electrical force and surface tension. At a certain voltage range, a fine jet of polymer solution (or melt) forms at the tip of the Taylor cone and shoots toward the target. Forces from the electric field accelerate and stretch the jet. This stretching, together with evaporation of solvent molecules, causes the jet diameter to become smaller. As the jet diameter decreases, the charge density increases until electrostatic forces within the polymer overcome the cohesive forces holding the jet together (e.g., surface tension), causing the jet to split or "splay" into a multifilament of polymer fibers. The fibers continue to splay until they reach the collector, where they are collected as nonwoven fibers, and are optionally dried. The diameter of an electrospun nanofiber is typically between about 50 nm and about 5 μm. High-speed photographic studies have suggested that, at least in some cases, what had appeared to be a multifilament was in fact a single, ultrafine fiber, being whipped very rapidly.

A wide variety of polymers have been electrospun from solutions and melts. A large number of papers describing the electrospinning process have been published, particularly in the past decade. Two recent review articles summarizing the state of the art are A. Frenot et al., "Polymer nanofibers assembled by electrospinning," *Current Opinion in Colloid and Interface Science*, vol. 8, pp. 64-75 (2003); and Z. Huang et al., "A review on polymer nanofibers by electrospinning and their applications in nanocomposites," Composites Science and Technology, vol. 63, pp. 2223-2253 (2003).

Baker D A, Brown P J. Reactive routes to making modified nanofiber structures via electrospinning. *Polymer Preprints* (2003), 44(2), 118-119 reported the addition of azides to polymer solutions prior to electrospinning. The azides could react, crosslink, functionalize, and covalently bind polymer chains. Electrospinning mixtures of polymers with the additives could be used for the covalent binding of synthetic polymers with natural polymers in a single manufacturing step. It was said that applying heat or UV light during electrospinning was said to modify nanofiber substrates either during the fiber formation process or by post-spin treatments; however, the only successful experimental results reported were apparently for post-spin reaction and cross-linking. The experimental procedures reported the preparation of solutions containing polymer and azide crosslinking agents. The solutions were then weighed, sealed, and checked for solvent loss during the time taken for dissolution. After an unspecified lapse of time, the solutions were later used in electrospinning procedures. The reaction and crosslinking in these experiments apparently did not take place until a post-spinning thermal analysis step.

Cross-linked polymers, hydrogels, hyperbranched polymers, and dendrimers have properties that differ from those of otherwise-comparable linear polymers. For example, they often have higher chemical stability and improved mechanical properties. They often possess unique chemical properties and functionalities. Such polymers have been used in diverse applications including coatings, composite resins, controlled drug release, organic-inorganic hybrid materials, solid supports for catalysts, and supports for chromatography or ion-exchange resins. However, highly cross-linked polymers and hyperbranched polymers are generally difficult to form as fibers through prior techniques, and even more difficult to form into nanofibers, because they typically have low solubility, and they typically will not melt without undergoing heat-induced decomposition, due to the strong intermolecular bonding or entanglement of the polymer molecules and the formation of polymer networks.

Ding, B. et al, "Preparation and characterization of a nanoscale poly(vinyl alcohol) fiber aggregate produced by an electrospinning method," J. Poly. Sci. B: Poly. Phys., (2002), 40, 1261-1268, reported the preparation of crosslinked poly (vinyl alcohol) (PVA) nanofibers (100-500 nm) by first mixing 0~10% glyoxal (a crosslinking agent) and phosphoric acid (as a catalyst) with a 10% PVA-water solution, then electrospinning the mixed solution at room temperature, followed by post-spinning thermal curing of the electrospun-PVA fiber in an oven at 120° C. for 5 min. It was reported that the crosslinked PVA fiber aggregates were more hydrophobic, and that they exhibited better mechanical properties.

U.S. Pat. No. 6,382,526 discloses a process for forming nanofibers by comprising the steps of feeding a fiber-forming material into an annular column, the column having an exit orifice, directing the fiber-forming material into a gas jet space, thereby forming an annular film of fiber-forming material, the annular film having an inner circumference, simultaneously forcing gas through a gas column, which is concentrically positioned within the annular column, and into the gas jet space, thereby causing the gas to contact the inner circumference of the annular film, and ejects the fiber-forming material from the exit orifice of the annular column in the form of a plurality of strands of fiber-forming material that solidify and form nanofibers having a diameter up to about 3,000 nanometers.

U.S. Pat. No. 6,520,425 discloses a nozzle for forming nanofibers by using a pressurized gas stream comprising a center tube, a first supply tube that is positioned concentrically around and apart from the center tube, a middle gas tube positioned concentrically around and apart from the first supply tube, and a second supply rube positioned concentrically around and apart from the middle gas tube. The center tube and first supply tube form a first annular column. The middle gas tube and the first supply tube form a second annular column. The middle gas tube and second supply tube form a third annular column. The tubes are positioned so that first and second gas jet spaces are created between the lower ends of the center tube and first supply tube, and the middle gas tube and second supply tube, respectively.

U.S. Pat. No. 6,308,509 discloses nanofibers having a diameter ranging from about 4 to 1 nm, and a nano denier of about $10^{-9}$. The use of the electro-spinning process permits production of the desired nanofibrils. These fibrils in combination with a carrier or strengthening fibers/filaments can be converted directly into nonwoven fibrous assemblies or converted into linear assemblies (yarns) before weaving, braiding or knitting into 2-dimensional and 3-dimensional fabrics. The electrospun fiber can be fed in an air vortex spinning apparatus developed to form a linear fibrous assembly. The process makes use of an air stream in a properly confined cavity. The vortex of air provides a gentle means to convert a mixture of the fibril fed directly or indirectly from the ESP unit and a fiber mass or filament into an integral assembly with proper level of orientation. Incorporation of thus produced woven products into tissue engineering is part of the present invention.

Published international patent application WO 01/27365 discloses a fiber comprising a substantially homogeneous mixture of a hydrophilic polymer and a polymer that is at least weakly hydrophobic. The fiber optionally contains a pH adjusting compound. A method of making the fiber is disclosed, electrospinning fibers of the substantially homogeneous polymer solution. The fibers are disclosed as having application for dressing wounds.

Recently, submicron fibers and nanofibers of ceramic oxides, such as silica and alumina-borate have been reported using a sol-gel process and electrospinning. See C. Shao et al., "A novel method for making silica nanofibres by using electrospun fibres of polyvinylalcohol/silica composite as precursor," *Nanotechnology*, vol. 13, pp. 635-637 (2002); and H. Dai et al., "A novel method for preparing ultra-fine alumina-borate oxide fibres via an electrospinning technique," *Nanotechnology*, vol. 13, pp. 674-677 (2002). A typical process includes (1) acid hydrolysis of organometallic precursors such as tetraethyloxysilane (TEOS) to form a colloid solution (sol), (2) mixing the sol with an aqueous or alcohol solution of a polymer such as polyvinyl alcohol (PVA), and digesting to form a viscous sol; (3) electrospinning the sol to form a silica/PVA composite gel fiber; (4) calcination or sintering the gel fiber to yield a porous silica or alumina fiber. $TiO_2$ and $SnO_2$ nanofibers have been prepared by electrospinning a titanium tetraisopropoxide $(Ti(OiPr)_4)$/poly(vinyl pyrrolidone)(PVP) solution, or a tin (IV) tetraisopropoxide (Sn $(OiPr)_4$) / PVP / ethanol solution, followed by rapid hydrolysis by moisture in air, and calcination. See D. Li et al., "Fabrication of titania nanofibers by electrospinning," *Nano Letters*, vol. 3, pp. 555-560 (2003); and D. Li et al., "Electrospinning of polymeric and ceramic nanofibers as uniaxially aligned arrays," *Nano Letters*, vol. 3, pp. 1167-1171 (2003). Because the composite gel fibers produced by these processes have contained high levels of organic polymers (typically, about 30% to 66% PVA or PVP), removal of the polymer by calcination has left substantial voids in the final ceramic nanofibers, voids that cannot be healed by calcination or sintering. Such porous ceramic oxide nanofibers have a large-surface area, and may be used in catalysts, filtration, or absorbents. However, they are not well-suited for use as reinforcing elements due to their poor mechanical properties.

Bioactive materials, such as bioactive glass, hydroxyapatite, and glass-ceramic A-W can react with biological fluids, and can bond directly to living bone. They have been used in orthopedic and dental implants and cements. However, such materials have had low fracture toughness. Zirconia and titania ceramics have been used to reinforce the bioactive materials. See T. Kasuga et al., "Bioactive glass-ceramic composite toughened by tetragonal zirconia," pp. 137-142 in Yamamuro et al. (Eds.), *CRC Handbook of Bioactive Ceramics*, Volume 1 (1990); and Kokubo et al, "Novel bioactive materials with different mechanical properties," *Biomaterials*, vol. 24, pp. 2161-2175 (2003). To the inventor's knowledge, however, zirconia-reinforced bioactive glass-ceramic nanofibers or zirconia nanofiber-reinforced bioactive glass-ceramics have not previously been reported.

The fabrication of α-alumina nanofibers by sol-gel chemistry and electrospinning was reported by G. Larsen et al., "A method for making inorganic and hybrid (organic/inorganic) fibers and vesicles with diameters in the submicrometer and micrometer range via sol-gel chemistry and electrically forced liquid jets," *J. Am. Chem. Soc.*, vol. 125, pp. 1154-1155 (2003).

Zirconia-based ceramics have superior properties such chemical resistance, thermal stability, high mechanical strength and toughness, high ionic conductivity, and catalytic properties. Zirconia has been widely used in engineering and technological applications. In recent years, zirconia-based ceramics have gained popularity in medical devices and dentistry because of their excellent esthetics, biocompatibility, and high toughness. Zirconia particles and nanoparticles have been used as fillers in dental composites to increase both radiopacity and resistance to hydrolytic degradation. There is an unfilled need for dense $ZrO_2$—$SiO_2$ and $ZrO_2$—$Y_2O_3$ nanofibers for use as reinforcement fillers in dental composites. Zirconia-based ceramic nanofibers will significantly increase the mechanical strength and fracture toughness of dental composites, while satisfying the stringent requirements for color and translucency needed for such- purposes. Current commercially available zirconia fibers are too thick for such applications (5~10 μm), because their resulting composites are highly opaque.

To the knowledge of the inventor, continuous, dense zirconia-based nanofibers have not previously been reported. Nor have there been prior reports of any method for the direct fabrication of dense ceramic nanofibers through precursor gel nanofibers by electrospinning, without the incorporation of a significant amount of organic polymer.

The production of continuous nanofibers by electrospinning requires polymers (or other macromolecules) in the form of a solution or melt. A solution or suspension of discrete small molecules, including, e.g., monomers, oligomers, colloids, or nanoparticles, cannot ordinarily be electrospun into a continuous nanofiber, but instead through an electrospray will produce droplets or nanoparticles. There is an unfilled need for a method to make continuous, cross-linked or hyperbranched polymer nanofibers, including crosslinked hydrogel nanofibers. There is an unfilled need for a method to modify the chemical or physical properties of polymers in nanofibers to yield cross-linked polymer nanofibers and other nanofiber materials that are difficult or impossible to make by existing techniques. To the inventor's knowledge, no prior work has reported the successful production of nanofibers or crosslinked nanofibers by electrospinning, in which polymerization or cross-linking reactions occur during or immediately prior to the electrospinning itself, as opposed to reactions that have occurred substantially before or substantially after the electrospinning process.

DISCLOSURE OF INVENTION

I have discovered novel nanofibers, and novel methods and apparatus for producing nanofibers. Cross-linked polymers and other materials, such as gel nanofibers of ceramic precursors, are formed into nanofibers by coupling electrospinning in-line with chemical reactions, photochemical reactions, or both.

It is one aspect of this invention to provide a general method for conducting reactive electrospinning in conjunction with chemical reactions, photochemical reactions, or both, and to control the relative timing of electrospinning and chemical or photochemical reaction in order to produce and to control the properties of the resulting nanofibers.

It is another aspect of this invention to couple an electrospinning device with an in-line chemical reactor or photochemical reactor, to allow chemical reactions or photochemical reactions to occur during or immediately prior to electrospinning.

It is yet another aspect of this invention to optimize the orientation of the electrospinning device relative to the direction of gravitational pull, to optimize the electrospinning procedure and its products.

It is yet another aspect of this invention to couple an in-line mixer with an in-line chemical reactor or photochemical reactor to precisely control the reaction time.

It is yet another aspect of this invention to control the temperature of the in-line reactor to modify the reaction rate and viscosity during electrospinning.

It is yet another aspect of this invention to use a pressurized sheath flow gas, or a pressurized central flow gas to aid in the electrospinning of highly viscous materials.

It is yet another aspect of this invention to add salts to the reaction mixture to aid in the electrospinning of highly viscous materials.

It is yet another aspect of this invention to use an acoustic source (e.g., an ultrasonic transducer) to aid the mixing of reactants and the electrospinning of highly viscous materials.

It is yet another aspect of this invention to configure the apparatus to avoid high voltage hazard from devices attached to the reactive nozzle.

It is yet another aspect of this invention to provide an apparatus for continuously forming nanofibers and post-spinning processing. The method of the present invention may be conducted as a continuous process, without clogging of the capillary, for a time substantially greater than the time during which a batch reaction mixture would become too viscous to undergo electrospinning into nanofibers. Alternatively, the method of the present invention may be conducted as a batch process.

The combination of some or all of these aspects of the invention offers significant advantages over prior processes and nanofibers. This invention will significantly expand the applications of electrospinning. It allows the production of nanofibers of cross-linked polymers, as well as non-polymeric materials such as gel nanofibers of ceramic precursors.

MODES FOR CARRYING OUT THE INVENTION

Figure 1:
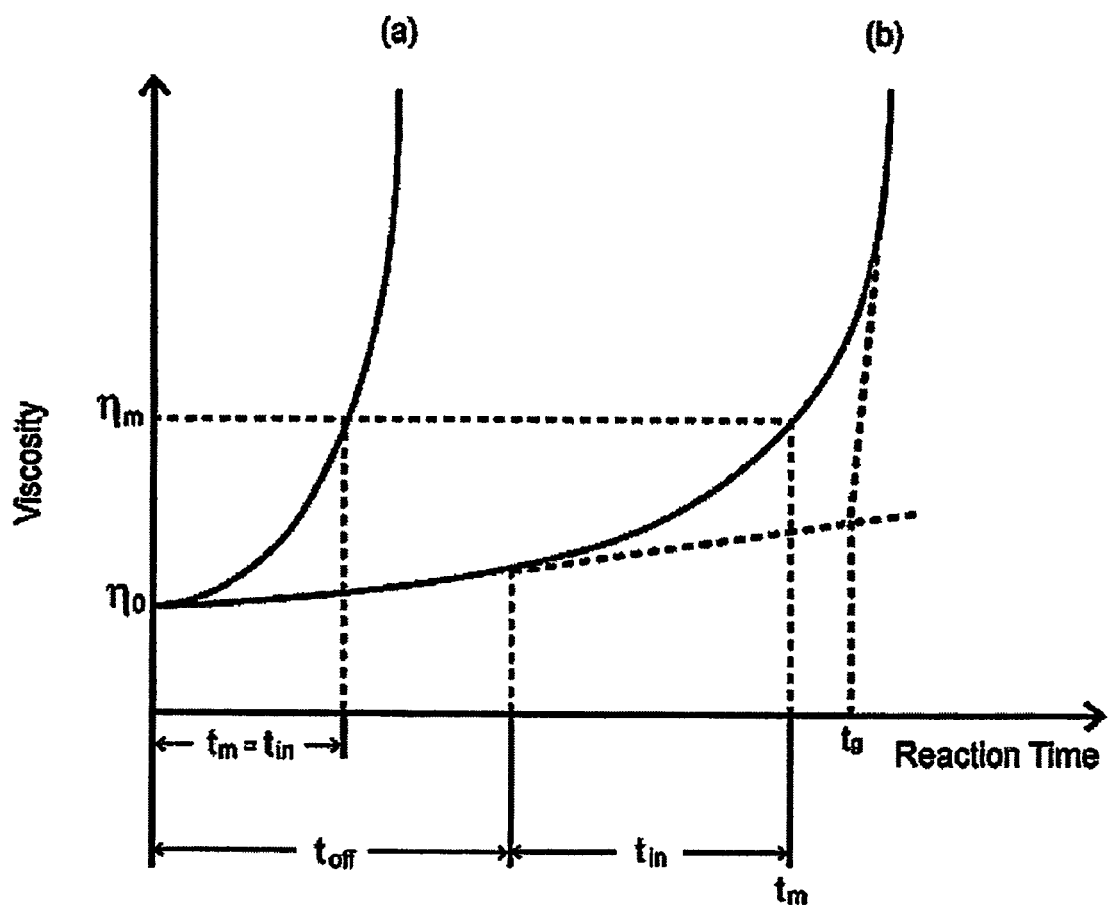
FIG. 1 depicts a chart showing the change in viscosity of the spinable materials as a function of reaction time. Curve (a) depicts a fast reaction. Curve (b) depicts a slow reaction.

Cross-linking or hyperbranching causes the viscosity of the solution or melt to increase rapidly. At the so-called "gel point" or "gel time," the viscosity has increased so much that the solution becomes a gel or even a solid, leading to phase separation or precipitation. FIG. 1 depicts two such reactions. Curve (a) depicts a fast reaction, where the viscosity increases rapidly from the beginning. Examples of such reactions include the photopolymerization of cross-linkable monomers, cross-linking reactions induced by UV or gamma radiation, some metal-initiated polymerizations, and some chemical crosslinking reactions. Curve (b) depicts a slow-starting reaction, where the viscosity initially changes slowly and later accelerates. Many chemically induced polymerization and cross-linking reactions are characterized by this type of curve.

Electrospinning is coupled in-line with solution chemistry, photochemistry, or both. The spinning reagents, such as soluble linear polymers, prepolymers or macromonomers, are mixed with cross-linkers, initiators, catalysts, or other reagents immediately before or even directly inside an in-line reactor, so that chemical reactions, photochemical reactions, or both occur immediately before electrospinning, during electrospinning, or both. In special cases, such as a reaction that will not proceed (or that will proceed only slowly) without photochemical or heat activation, the various reaction components may be mixed in advance, but will delay reaction until photochemical activation.

The relative fraction of cross-linkers and catalysts is normally small, e.g., 1~10% of the reaction mixture by mass. Their effects on surface tension are generally insignificant. The limiting factor in reactive electrospinning will normally be the viscosity of the mixture, particularly the gel point, i.e., the point at which the viscosity increases dramatically. Timing thus becomes very important. It is highly desirable, and in most cases is essential, for the reaction mixture to exit the electrospinning capillary before it reaches the gel point. Otherwise, the viscosity of the material can become so high that stable electrospinning cannot be maintained, or the backpressure can exceed the limits of the delivering pump'or precipitates may clog the capillary.

In FIG. 1, $\eta_0$ represents the initial viscosity (immediately after mixing), and $\eta_m$ represents the maximum viscosity that still allows stable electrospinning. The value of $\eta_m$ may be determined, for example, by varying the concentration of a soluble linear polymer (preferably, the main component of the desired product) under otherwise identical electrospinning operating conditions (e.g., high voltage, flow rate, capillary-collector distance). In FIG. 1, $t_m$ represents the maximum reaction time, i.e., the reaction time corresponding to the maximum viscosity $\eta_m$. For fast reactions, $t_m \approx t_{in}$, where $t_{in}$ is the in-line reaction time, including any time delay between the mixer and the in-line reactor, and also including the time the reaction mixture remains inside the electrospinning capillary. For slow reactions, $t_m \approx t_{in} + t_{off}$, where $t_{off}$ is the off-line reaction time, the period during which the reactants are be mixed and react in an off-line reactor. Typically, a slower reaction is initiated by heating or light radiation in the off-line reactor for a period of time ($t_{off}$), then inhibited by lowering the temperature or turning off the light source, and the partially reacted material is then injected into the in-line reactor under heating or light radiation to continue further reaction. The overall controlling condition is:

$$t_{in}+t_{off} \leq t_m = kt_g \quad (1)$$

where $t_g$ is the gel time, and k is a constant. The gel time $t_g$ may, for example, be determined by the intersection of the extrapolation of the slowly-increasing portion and the rapidly-increasing portion of the plot of viscosity versus time. The gel time $t_g$ may also be determined by other methods such as measuring the loss tangent (tan δ) or the critical strain using either a dynamic stress rheometer or a Fourier transform mechanical spectrometer. The constant k is typically between about 0.8 and about 1.1, and depends on the shape of the viscosity-versus-time curve and the method used for measuring $t_g$. For many applications, k equals 1; $t_m$ equals $t_g$ and therefore the maximum viscosity $\eta_m$ is the value at the gel point.

The spinning material leaves the electrospinning capillary before or near the gel point, before the reaction has proceeded to completion. Therefore, post-spinning processing may include, for example: merely allowing the reaction to proceed post-spinning under ambient conditions, adding further reactants, adding further solvent or nonsolvent liquids, heat, and radiation from UV, visible, or infrared light, gamma rays, or electron beam.

There are several advantages to producing cross-linked nanofibers and the like by reactive electrospinning in accordance with the present invention, as opposed to a process that relies entirely on post-spinning processing, for example: (1) the reactants are more thoroughly mixed in a homogeneous medium, rather than depending on the swelling of solid fibers or the diffusion of components (e.g., the cross-linker); (2) even nanofibers that are only partially crosslinked may exhibit substantially better chemical stability and better mechanical properties than their linear counterparts, which may be too fragile or too soluble for post-spinning processing (e.g., many hydrogels); (3) some multifunctional cross-linkable monomers (e.g., di-, or tri-acrylates, methacrylates, vinylbenzene, vinyl alkenes) must be mixed with other co-monomers and then undergo co-polymerization so that each polymerizable group on the cross-linking monomer is inserted in to the linear polymer backbone, which is not feasible with post-spinning processing alone.

There are several techniques that may be used to simultaneously control the reaction rate, to lower the viscosity, and to allow a more viscous solution to be spun. Such techniques include the following:

(1) Heating the electrospinning capillary to increase reaction rates. Many polymerization or cross-link reactions require higher temperatures, e.g., in the range from about 60° C. to about 250° C. Higher temperature also typically increases solubility and decreases viscosity of the polymer solution or melt because viscosity in a polymer system significantly depends on temperature. The viscosity of a polymer melt or solution often may be approximated as $$\eta(T) = A_0 \exp(E_a/RT) \quad (2)$$

where $\eta(T)$ is the zero-shear viscosity at temperature T (in degrees Kelvin); $E_a$. is the flow activation energy (J), R is the ideal gas constant (8.314 J/K), and $A_0$ is a constant. Heating the capillary of an electrospinning apparatus has generally been avoided, because the capillary has been at high voltage. But by grounding the capillary and placing the collector at high voltage instead, heaters, ultrasound transducers, or other devices may be placed on the capillary with less concern about high voltage hazards.

(2) Attaching an acoustic device (e.g., an ultrasonic transducer) to the electrospinning device. Alternatively, a focused, non-contacting ultrasonic source may be used. The application of ultrasound typically increases chemical reaction rates, decreases apparent viscosity, and increases solubility, because it induces acoustic cavitation and promotes convection. Because ultrasound helps mix reactants more thoroughly, it may produce more uniform fibers for some reaction mixtures. As a side benefit, ultrasound may also help to clean out the capillary without dismantling the device for mechanical cleaning. To minimize potential adverse effects from sonication, such as decreasing the stability of the electrospinning jet or disrupting the electrospinning process by turning it into an electrospray, it is preferred to use low frequency acoustic energy (e.g., ~22 kHz), and the power of the acoustic energy should be controlled. To the knowledge of the inventor, the use of ultrasound in conjunction with electrospinning has never previously been proposed.

(3) Adding a pressurized gas (e.g., nitrogen gas) in a coaxial sheath flow, a coaxial central flow, or both. The pressurized gas flow helps to promote solvent evaporation and to produce finer and drier fibers. A pressurized gas flow may be particularly helpful when a high boiling point solvent is used (e.g., DMF, isopropanol, or $H_2O$). Nitrogen is preferred for the pressurized gas because it is inert, inexpensive, and non-flammable. Nitrogen gas can help prevent fire or explosion of an organic solvent/air mixture, which might be ignited by sparks generated by a high electric field. An inert gas such as nitrogen can also help to suppress corona discharge (dielectric breakdown of the air), thus allowing the use of higher voltages in electrospinning. Other gases may also be used, such as carbon dioxide, air, argon, helium, vapor of solvent or non-solvent liquids, sulfur hexafluoride, fluorocarbons, and mixtures.

(4) Adding electrolytes (salts) to the reaction mixture will increase conductivity and charge density, and can help to produce finer fibers from the viscous solution due to coulombic repulsion. For example, salts such as NaCI, LiCI, $CaCl_2$, and $(Bu)_4NCl$ can be used. Preferred is a tetraalkylammonium triflate salt such as $(Bu)_4N$ $(CF_3SO_3)$ (Tetrabutylammonium trifluoromethanesulphonate (triflate) or TBATFL) due to its high solubility in organic solvents and to the low nucleophilicity of its anion (triflate $F_3CSO_3$). TBATFL thus has relatively low potential for interference with polymerization or cross-linking reactions.

Some general guidelines, or preferred approaches, in electrospinning nanofibers are the following: (1) Parameters that affect the diameter and morphology of electrospun nanofibers include the electric field strength, solution concentration, viscosity, surface tension, and conductivity—particularly viscosity. A viscosity in the range from tens to hundreds poise helps promote a stable electrospinning process. Within a certain range (e.g., ~30 to ~150 μL/min), the flow rate of the solution does not strongly affect the diameter or morphology of the fiber. (2) Adding a small amount of a salt increases conductivity and thus the electrospinning current. But the conductivity should not be too high, or electrospinning turns into electrospray, producing droplets and particles instead of fibers. (3) When a less volatile solvent such as DMF or water is used as the solvent, the fibers generated by electrospinning are often "wet" (containing 30~80% solvent). Wet fibers tend to attach to one another. As a result, a fused mat is produced instead of long continuous fibers. Also, wet polymer or gel fibers may bond to the electrospinning collector, making it difficult to separate fibers from the collector without damaging the fibers. Therefore, dry fibers are usually preferred. A longer distance between nozzle and collector helps produce drier fibers.

EXAMPLE 1

Figure 2:
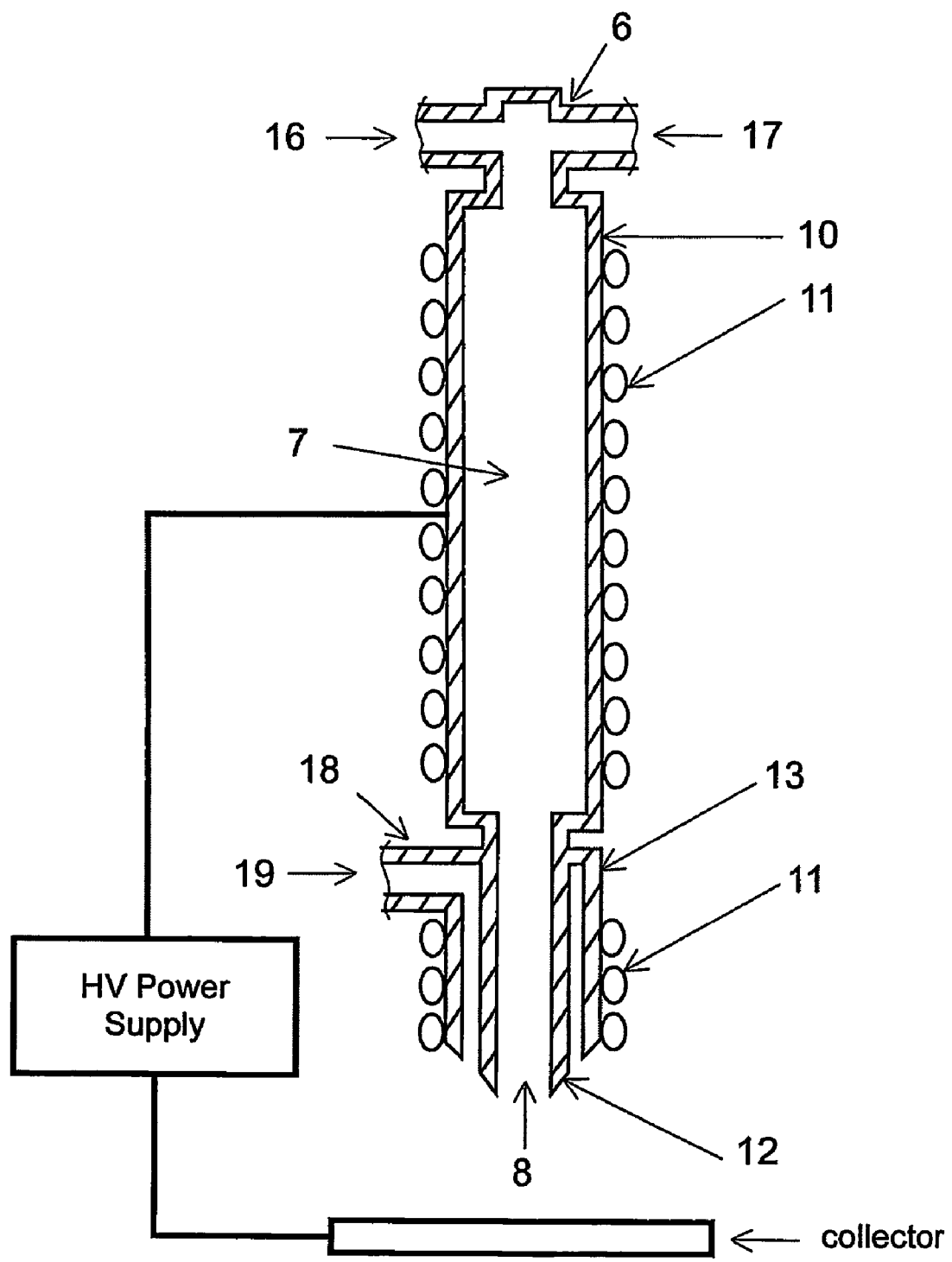
FIG. 2 depicts schematically an apparatus for performing chemical reactive electrospinning in accordance with this invention.

FIG. 2 depicts an embodiment of a reactive nozzle for chemical reactive electrospinning. It comprises an in-line mixer 6, an in-line chemical reactor 10, one or more coil heaters 11, an electrospinning capillary 12, and a sheath gas tube 13. The reactants are separately introduced though ports 16 and 17, and are mixed in mixer 6. The mixture 7 undergoes chemical reaction in the heated in-line reactor 10 and commences electrospinning at outlet 8 of capillary 12 with the assistance of sheath gas 19, which is introduced through port 18. The total in-line reaction time is $$t_{in}=(V_1+V_2+V_3)/F \quad (3)$$

or $$t_{in}=\pi(L_1d_1^2+L_2d_2^2+L_3d_3^2)/(4F) \quad (4)$$

where $t_{in}$ is the total in-line reaction time (min.); $V_1$, $V_2$, and $V_3$ are the volumes (ml) of the mixer, the reactor, and the capillary, respectively; $L_1$, $L_2$ and $L_3$ are length (mm) of the mixer, the reactor, and the capillary, respectively; $d_1$, $d_2$, and $d_3$ are the inner diameters (mm) of the mixer, the reactor, and the capillary, respectively; and F is the total flow rate (ml/min).

Referring to FIG. 2, electrospinning capillary 12 should have an outer diameter from about 0.1 to about 15 mm, preferably from about 0.5 to about 3 mm. Sheath gas tube 13 in FIG. 2 is positioned concentrically outside and apart from capillary 12. The space between the inner wall of the sheath gas tube and the outer wall of the capillary is preferably from about 0.05 to about 10 mm. The sheath gas tube 13 is preferably also heated by the coil heater(s) 11.

EXAMPLE 2

Figure 3:
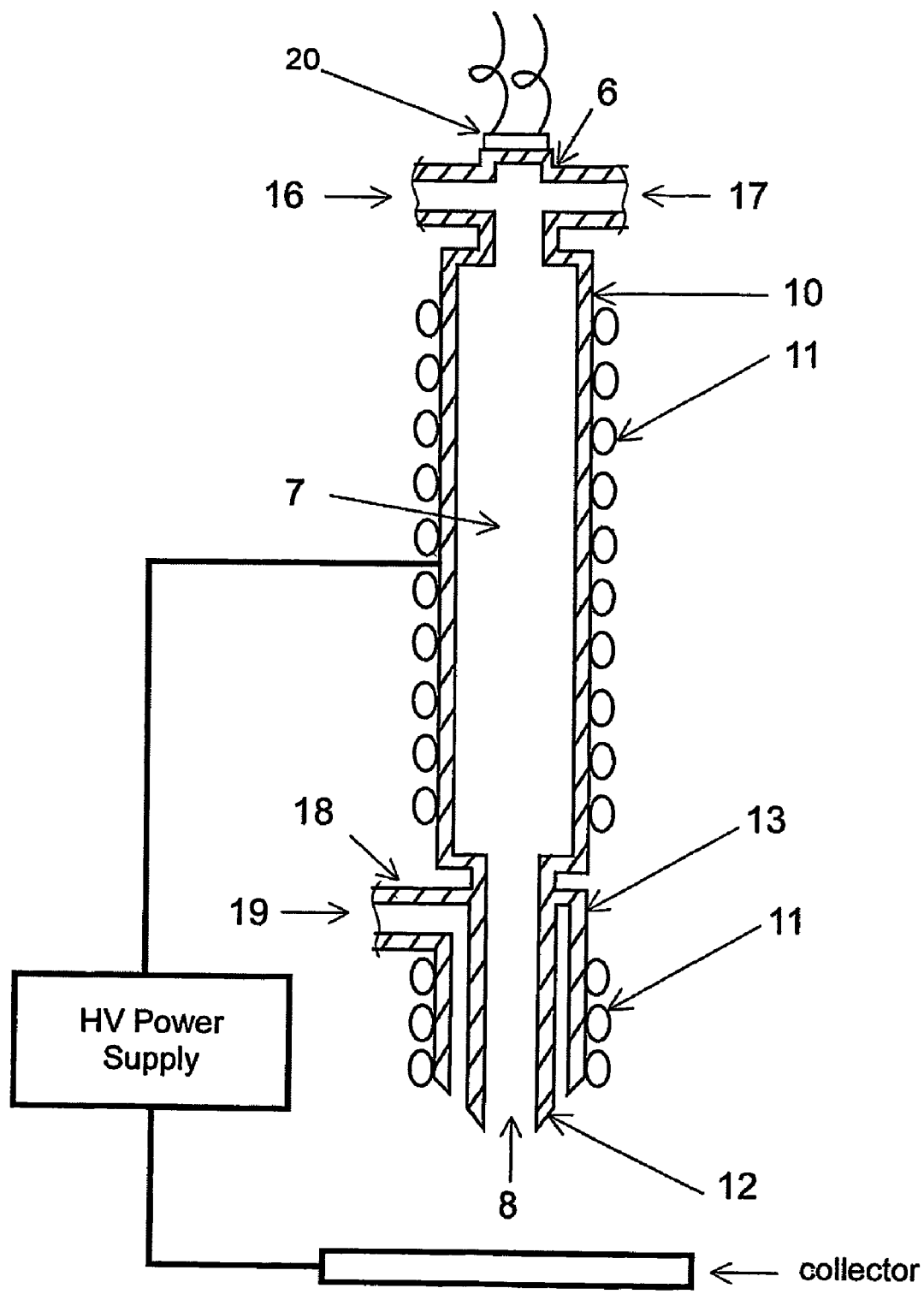
FIG. 3 depicts schematically an embodiment of apparatus in accordance with this invention, including an ultrasonic transducer.

In another embodiment of the reactive nozzle, shown in FIG. 3, an ultrasonic transducer 20 is attached to mixer 6.

EXAMPLE 3

Figure 4:
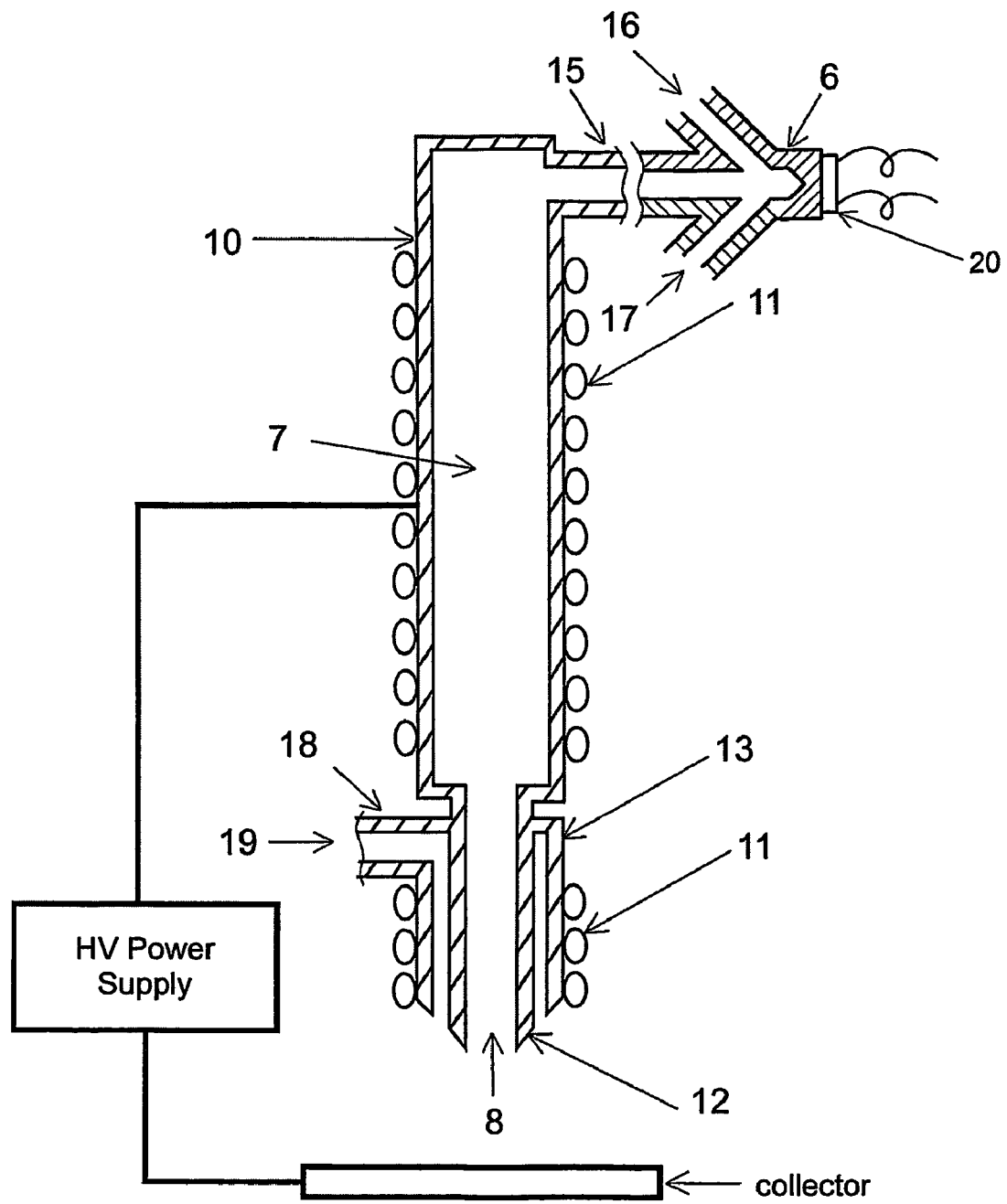
FIG. 4 depicts schematically an embodiment of apparatus in accordance with this invention, including a reactive nozzle for chemical reactive electrospinning, and an in-line mixer with an ultrasonic transducer.

In another embodiment of a reactive nozzle (FIG. 4), a separate in-line mixer 6 with an ultrasonic transducer 20 attached is connected to the inlet port 15 of the reactor through a flexible tubing. This configuration allows the use of a high efficiency commercial mixer such as is commonly used in chromatography. Connecting the mixer 6 to the reactor 10 through flexible tubing can help reduce potential adverse effects of sonication on the electrospinning process, while maximizing its benefits. The flexible tubing makes it easier to control both processes. In such a case, the "$L_1$" parameter should include the length of connecting tubing.

EXAMPLE 4

Figure 5:
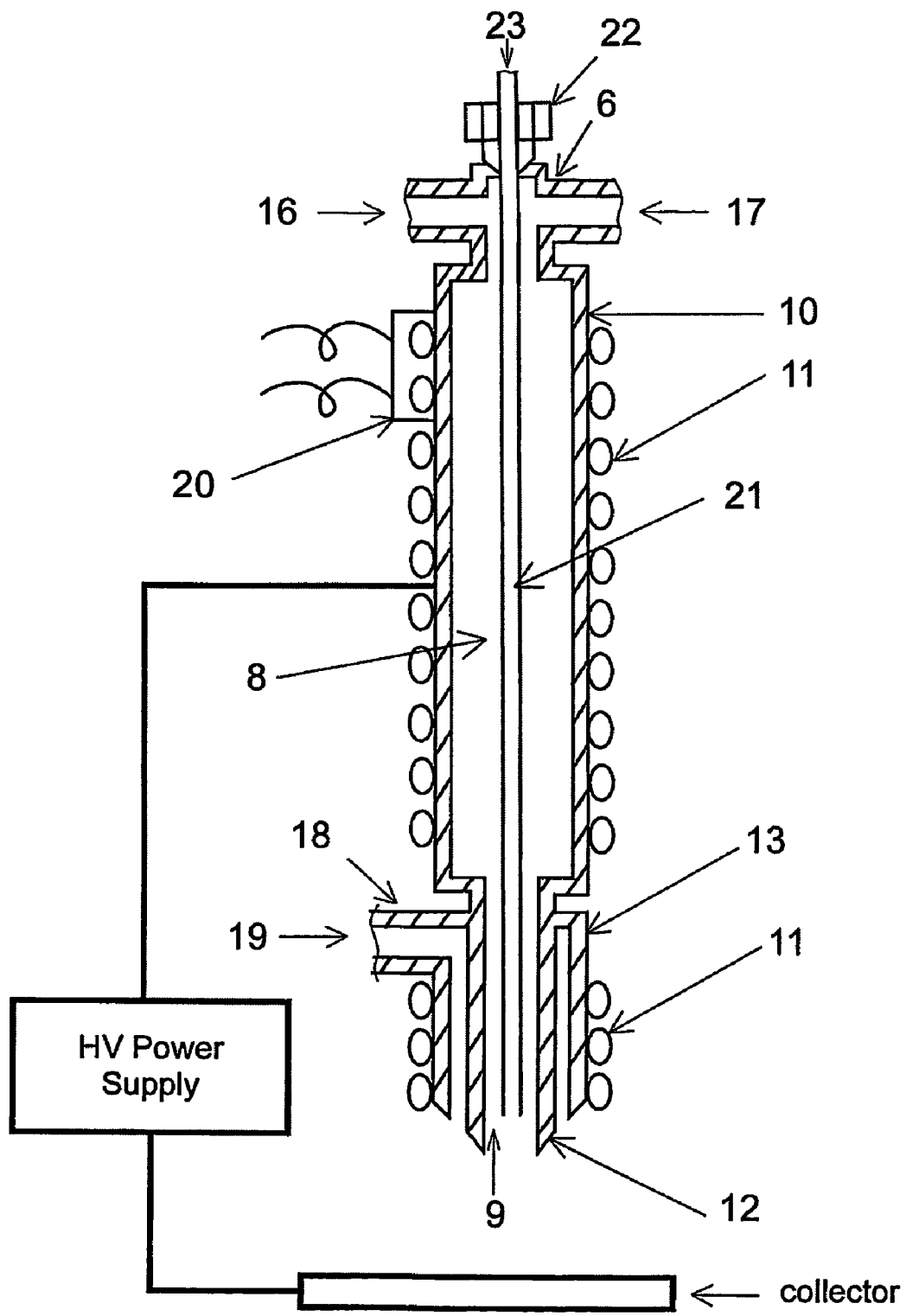
FIG. 5 depicts schematically an embodiment of apparatus in accordance with this invention, including a central tube that may be used to introduce a composition such as a flowing gas, an additional reagent, an immiscible polymer solution, or a suspension of nanoparticles.

In another embodiment of a reactive nozzle, depicted in FIG. 5, the nozzle includes central tubing 21, positioned concentrically inside and apart from capillary 12. The annular distance 9, between the outer wall of the central tubing and the inner wall of the capillary, is between about 0.05 and about 7 mm. The relative positions of the outlet of central tubing 21 and that of the capillary 12 may optionally be adjusted, for example through ferrule-and-nut combination 22. A pressurized gas 23 is introduced through the central tubing 21 to assist electrospinning; the gas flow may also result in a plurality of finer output jets. The total in-line reaction time tin is:

$$t_{in}=(V_1+V_2+V_3-V_4)/F \quad (5)$$

or $$t_{in}=\pi(L_1d_1^2+L_2d_2^2+L_3d_3^2-L_4 D_4^2)/(4F) \quad (6)$$

where $V_4$, $L_4$, and $D_4$ are the volume, length, and outer diameter, respectively, of the central gas tubing 21. Other symbols have the same meanings as given above.

Central tubing 21 may also be used to introduce other reagents or substances to the electrospinning reaction mixture, e.g., a catalyst, another polymer solution, a therapeutic drug, or a suspension of solid nanoparticles or nanotubes. Such a configuration can help to reduce back-pressure and to reduce potential problems with clogging of the mixer or reactor by a highly viscous solution. If one reactant (e.g., a linear polymer solution) is introduced through inlet 16 (with another inlet 17 blocked), and a second reactant (e.g., cross-linker or catalyst) is introduced through the central tubing 21, the two reactants do not mix until the second reactant leaves the tip of the central tubing 21. Then the in-line reaction time $t_{in}$ is:

$$t_{in}=\pi(L_2'd_2^2+L_3'd_3^2)/(4F) \quad (7)$$

where $L_2'$ is the distance from the end of central tubing 21 to the end of the reactor 8; $L_3'$ is the distance from the end of central tubing 21 to the end of capillary 12; $d_2$ and $d_3$ are the inner diameters of the reactor and the capillary, respectively; and F is the total flow rate.

A device coupling electrospinning and photochemical reaction may be made by inserting a metal wire into a disposable glass Pasteur pipette hung vertically, and placing a light source beside the pipette. However, it is difficult to control the flow rate with such a device.

EXAMPLE 5

Figure 6:
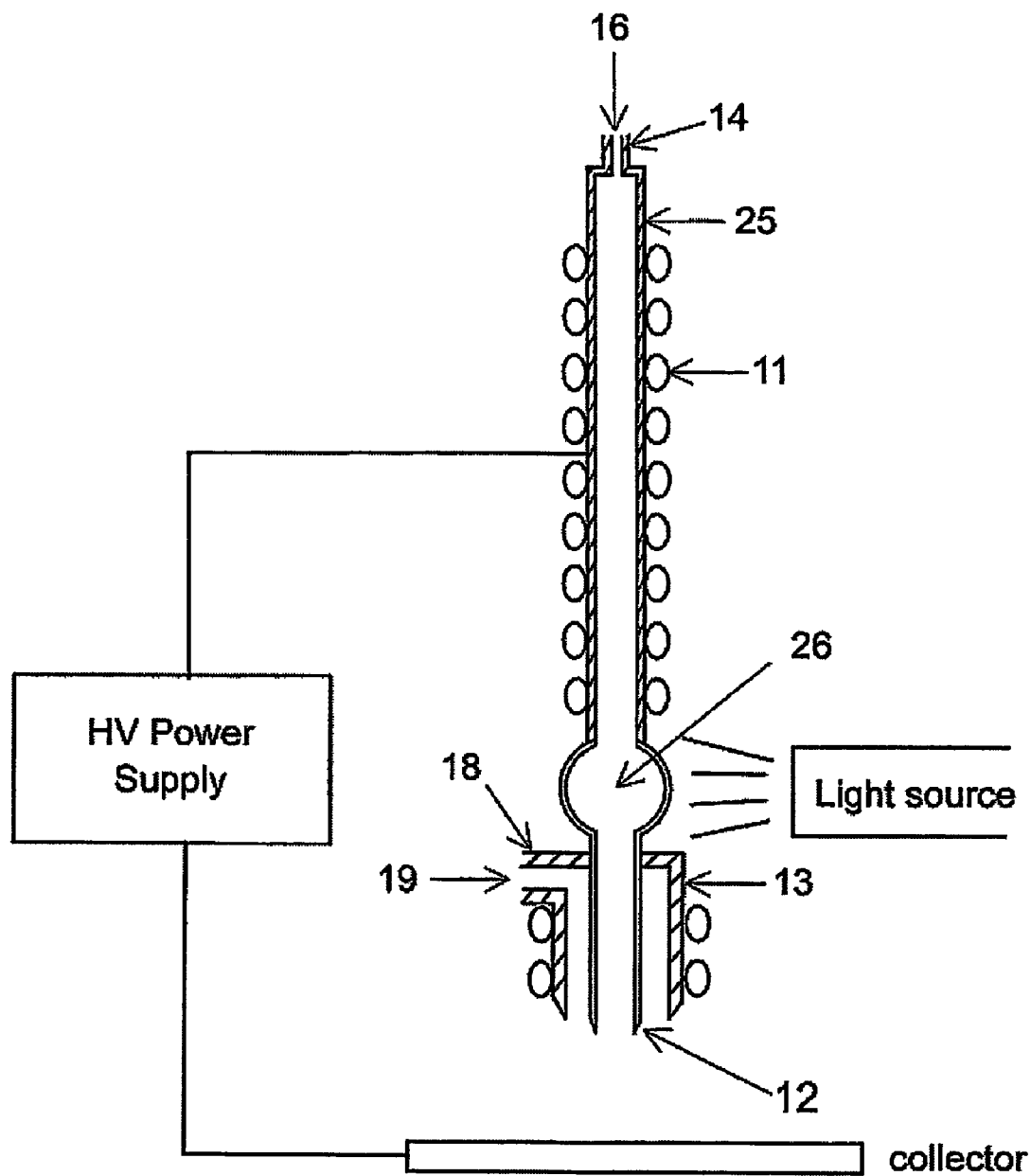
FIG. 6 depicts schematically an apparatus for performing photochemical reactive electrospinning in accordance with this invention.
Figure 8:
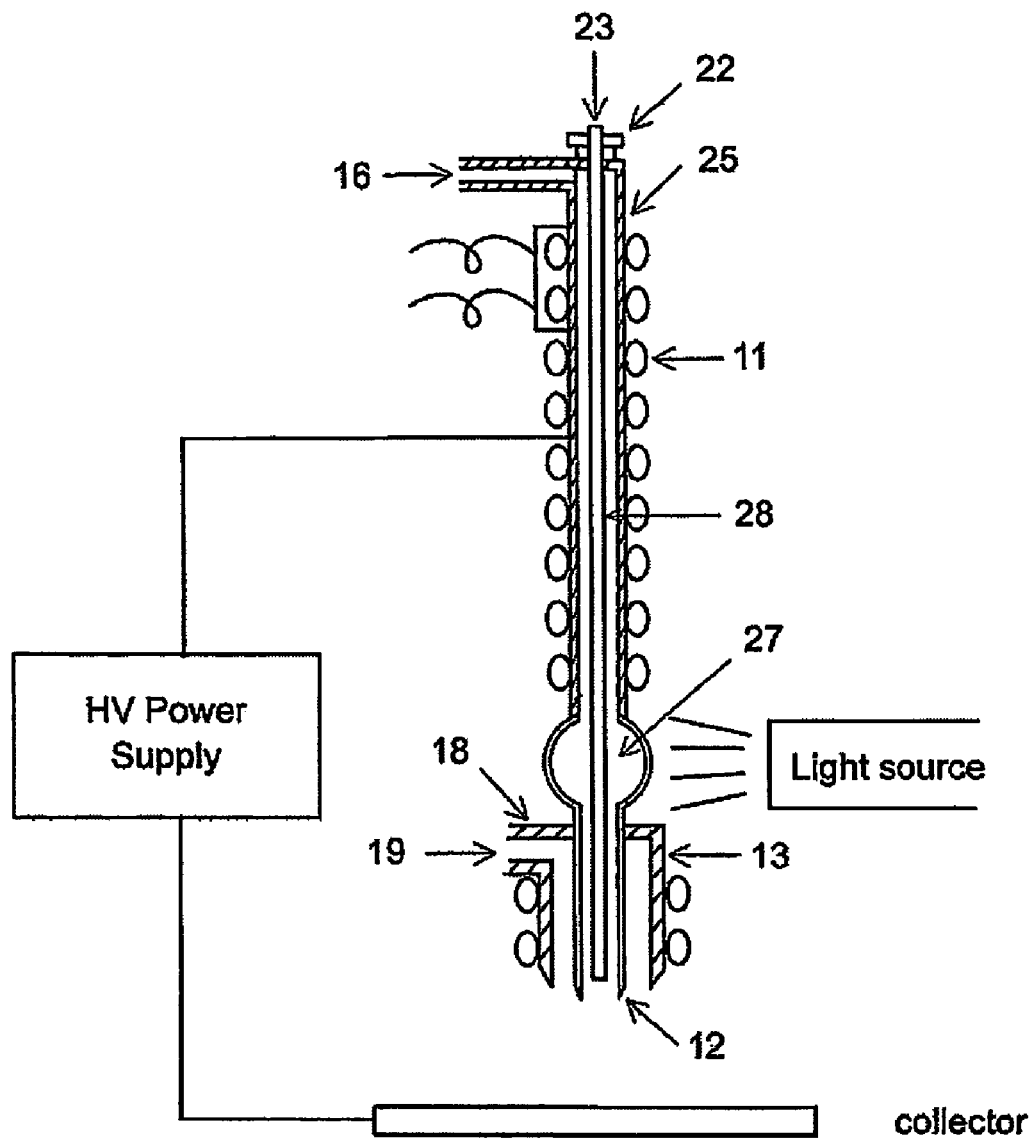
FIG. 8 depicts schematically an apparatus for performing photochemical reactive electrospinning, including an ultrasonic transducer and central gas tubing.
Figure 9:
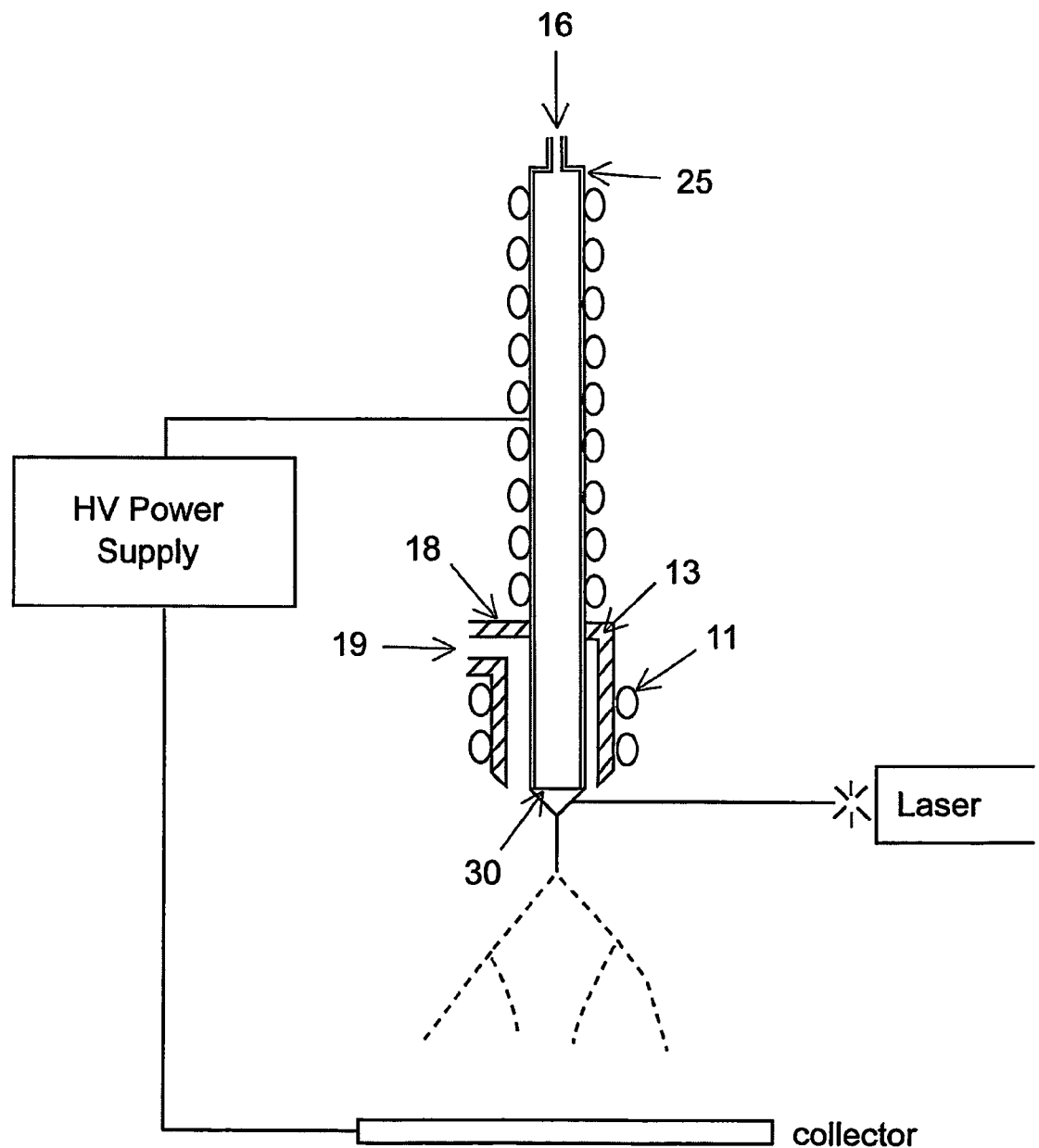
FIG. 9 depicts schematically an apparatus for performing photochemical reactive electrospinning in accordance with this invention, including a laser source aimed at the outlet (Taylor cone) of the electrospinning capillary.

FIG. 6 is a schematic representation of an apparatus for performing photochemical reactive electrospinning. Spinable material 16 is introduced through inlet 14 into the heated chamber or tubing 25, and then into the photochemical reactor 26, whose walls are formed of a transparent, inert material that can withstand the required temperature. A preferred material for this purpose is glass or quartz. Other materials such as fused silica, sapphire, ZnSe, or diamond may also be used. Even a transparent, rigid polymer such as polystyrene or poly(methyl methacrylate) might be used in a suitable temperature range (e.g., less than about 100° C.). Typically, the mixture of reactants and photoinitiator require relatively intense light radiation of appropriate wavelength before photochemical reactions commence at a substantial rate. An in-line mixer may therefore not be required when the reactants can be safely mixed off-line under relatively dim ambient lighting conditions. In such a case, there will also be minimal reaction in chamber 25. The total in-line reaction time in this apparatus is:

$$t_{in} = (V_3 + V_5)/F \quad (8)$$

where $V_3$ and $V_5$ are the volume (ml) of capillary 12 and photochemical reactor 26, respectively; F is the total flow rate (ml/min). In the apparatus of FIGS. 6, 8, and 9, a mixer 6 is optional, and is therefore not depicted. (Compare the apparatus of FIGS. 3, 4, and 5).

EXAMPLE 6

Figure 7:
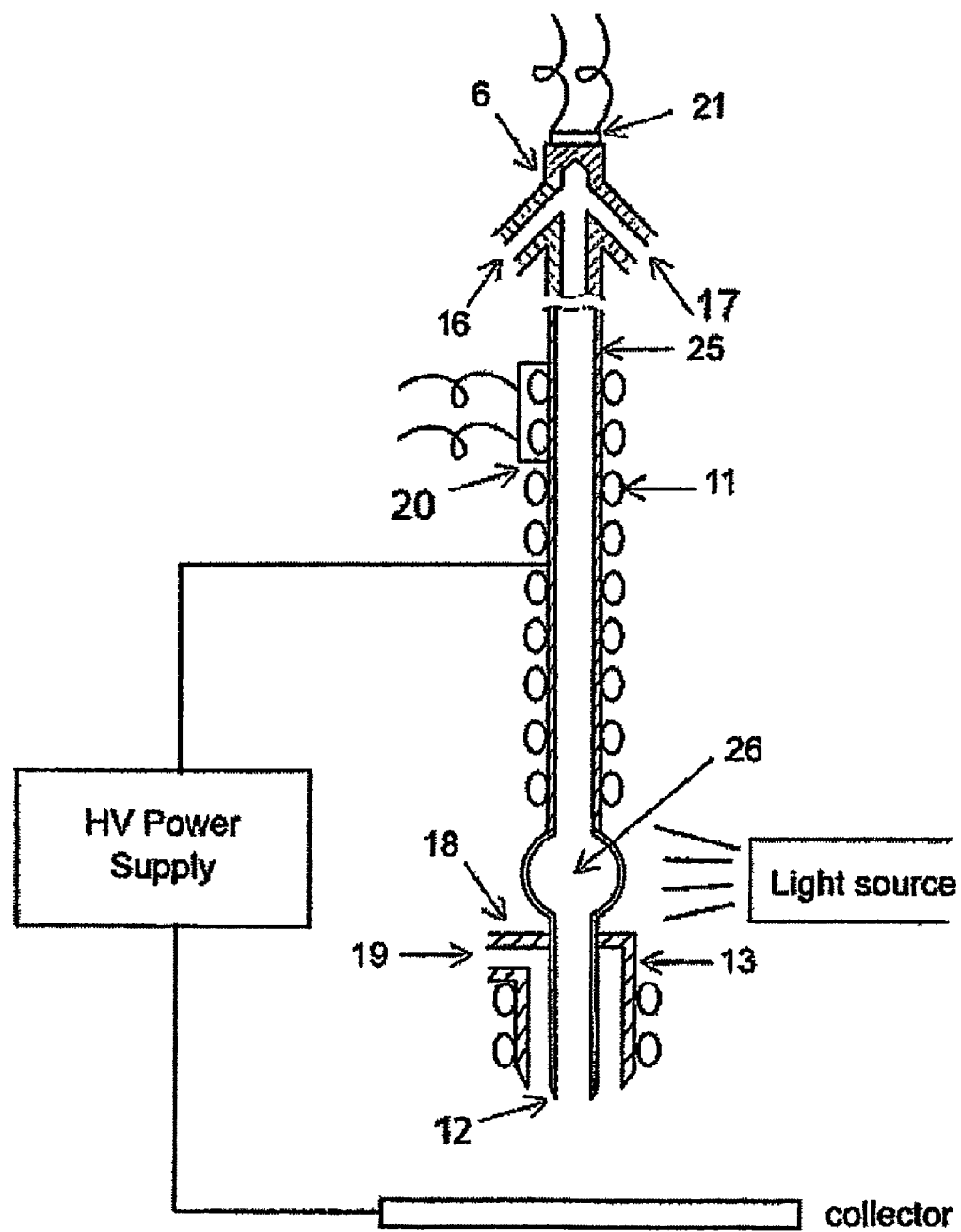
FIG. 7 depicts schematically an apparatus for performing photochemical reactive electrospinning, including an ultrasonic transducer and a mixer connected to the in-line reactor through flexible tubing.

FIG. 7 depicts another embodiment of a reactive nozzle for photochemical reactive electrospinning. The apparatus includes an ultrasonic transducer 20 and a separate mixer 6 that is connected to the in-line reactor through flexible tubing. This configuration combines an in-line chemical reactor with a photochemical reactor (a "dual-cure" system), and thus offers more versatility for certain applications. For example, a soluble linear polymer or prepolymer solution and a cross-linker solution (with catalysts or photoinitiators) may be introduced separately through ports 16 and 17 and then mixed in mixer 6 with the aid of another ultrasonic transducer 51. The mixture undergoes a chemical reaction in the in-line reactor 25, then a photochemical-reaction in the photochemical reactor 26, then followed by electrospinning. The total in-line reaction time is $$t_{in} = (V_1 + V_2 + V_3 + V_5)/F \quad (9)$$

where $V_1$, $V_2$, $V_3$ and $V_5$ are the volume (ml) of the mixer 6 (including the connecting tubing), chamber 25, capillary 12, and photochemical reactor 26, respectively.

EXAMPLE 7

FIG. 8 depicts another embodiment of a reactive nozzle for photochemical reactive electrospinning. The nozzle includes central tubing 28, whose position may be adjusted, for example through ferrule-and-nut combination 22. A pressurized gas 23 is introduced to further assist electrospinning, and optionally to produce a plurality of finer jets. The total in-line reaction time is:

$$t_{in} = (V_3 + V_5 - V_4)/F \quad (10)$$

where $V_3$ and $V_5$ are the volume (ml) of capillary 12 and photochemical reactor 26, respectively; $V_4$ is the volume occupied by central tubing 28; and F is the total flow rate (ml/min).

In the apparatus of each of FIGS. 6, 7, and 8, the light source comprises an actinic radiation source, for example one with a wavelength between about 170 nanometer and about 2000 nanometer, preferably between about 220 nm and about 760 nm (ultraviolet-visible light); and having an irradiance between about 100 mW/cm² and about 100,000 milliwatt per square centimeter, preferably between about 500 mW/cm² and about 10,000 mW/cm².

The light source is preferably a focused light beam, for example a focused light beam having a diameter or length between about 0.1 and about 500 millimeter, focused with hyperbolic mirrors, lenses, or a fiber optic bundle, or the optics found in a typical laser source.

The light source may, for example, be emitted by a tungsten source, tungsten-halogen, tungsten-quartz-halogen, mercury, xenon, plasma, light-emitting-diode (LED), electric sparks, or laser.

EXAMPLE 8

FIG. 9 depicts another embodiment of a reactive nozzle for photochemical reactive electrospinning. In this embodiment, the photochemical reactor is the Taylor cone 30 itself, formed at the outlet of the electrospinning capillary. A laser beam irradiates the Taylor cone. The diameter of the laser beam is preferably about the same as the inner diameter of capillary 12. This design reduces clogging resulting from high viscosity solutions, melts, or precipitates. A potential disadvantage to this design is that the photochemical reaction time is very short (typically, a few milliseconds). To help prolong the reaction time somewhat, the diameter of the capillary may be increased, and the flow rate may be slowed, provided that a stable electrospinning process is maintained. Also, a high power laser source may be used, so long as the power is not so high as to cause decomposition or burning of the spinning material. A short-wavelength (~200 nm to ~500 nm, ultraviolet to blue light) is generally preferred over a red or infrared laser.

In an alternative embodiment for photochemical electrospinning (not shown), multiple light sources may be used to simultaneously illuminate some or all of the photochemical reactor, the electrospinning jet, and the collector. In cases where the electrospinning solution is highly photosensitive, for example, one might expose only the electrospinning jet and the collector, but not the reactor. Multiple light sources may, for example, be an array of fiber optic bundles, an array or lamps, or equivalently, a single lamp that is large enough or long enough to illuminate the entire region of interest.

It is preferred that the outlets of the capillary and of the sheath gas tube be beveled, to minimize interferences in the electric field.

The high voltage power supply depicted in the apparatus of FIGS. 2 through 10 should provide a voltage between about 1 and about 100 kilovolt. A preferred range is from about 3 to about 50 kV. In most prior electrospinning apparatus, the capillary has been placed at a high positive potential, and the collector has been grounded, to make it relatively easy and safe to collect spun fibers for post-spinning processing. However, in the present invention that configuration might pose a high voltage hazard to the devices attached to the capillary (e.g., heater, ultrasonic transducer, temperature sensor, pumps).

It is therefore preferred that the capillary and all attached components should be grounded; and that the collector, electrically insulated from the ground and the capillary, should be set at high (negative or positive) potential. The fibers may be collected after the high voltage has been switched off and the collector discharged. An additional advantage to such a configuration is that optical devices, such as a light guide, may be placed closer to the capillary without serious interference to the electric field because they are at the same ground potential. Another advantage of this configuration is that the charges on the spun fiber may be preserved or manipulated, and used for such applications as high efficiency air filters. When accessories such as a temperature control or acoustic source are not used, the "ordinary" electrospinning configuration, with the capillary at high voltage and the collector at ground, may be used instead.

EXAMPLE 9

Figure 10:
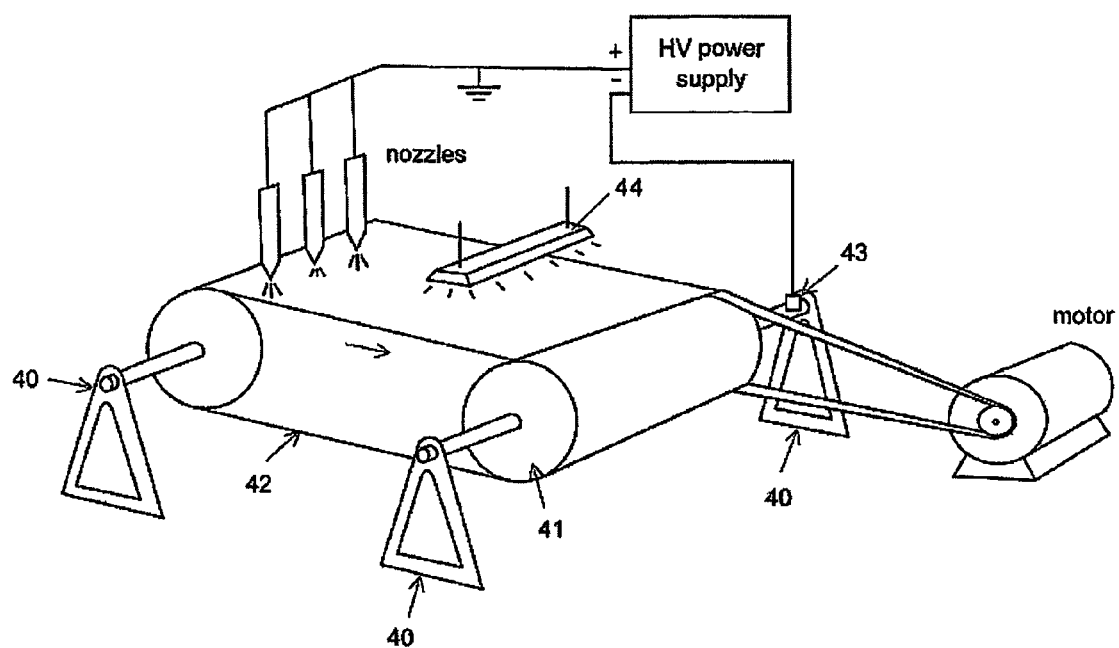
FIG. 10 depicts schematically an apparatus for continuous production of nanofibers in accordance with this invention, where the nozzles and attached devices are placed at ground potential while the high voltage is connected to the collector, which in this embodiment comprises a conducting moving belt around a pair of rotating metal drums supported by insulating materials.

In one embodiment, depicted in FIG. 10, an apparatus for the continuous production of nanofibers comprises a plurality of grounded nozzles and attached devices as previously described, with high voltage connected through a brush 43 to the collector, which is a conducting moving substrate 42 (e.g., a moving belt covered with a metal film or foil), which travels around a pair of a rotating metal drums 41 supported by insulating materials 40. Rotating metal drums 41 are driven by an insulating belt, which in turn is driven by a slow-rotating motor. Alternatively, metal drums 41 are driven by a low-voltage (e.g., 12-96 V) DC motor or a gear-motor assembly that is powered by batteries. The motor, gear-motor assembly, and batteries are all insulated from the ground and floated at the same high voltage as the drums. Post-spinning processor 44 may, for example, be an actinic radiation source (or combination of sources) such as UV light, visible light, infrared light, a gamma ray source, or a heater. Once the high voltage is switched off and the substrate 42 discharged, the spun fiber may optionally be processed with further chemical reactions, with solvent or nonsolvent liquids, or with an electron beam.

EXAMPLE 10

A prototype electrospinning apparatus as shown in FIG. 2 was constructed. Stainless steel tubes were purchased from Small Parts Inc. (Miami Lakes, Fl.). Fittings (Tees, unions, and ferrules) were purchased from VICI-Valco Instruments Co. Inc. (Houston, Tex.). Mixer 6 was an HPLC tee (1/16 inch nuts and ferrules, 0.75 mm I.D. holes). In-line chemical reactor 10 was a stainless steel tube (0.065 inch O.D., 0.053 inch I.D., 4 inch long). Capillary 12 was a stainless steel tube (0.0355 inch O.D., 0.026 inch I.D., 6 inch long), connected to in-line chemical reactor 10 through a reducing union. Sheath gas tube 13 was a stainless steel tube (0.065 inch O.D., 0.047 inch I.D., 4 inch long). Nitrogen gas was introduced through a second HPLC tee, which fixed both capillary 12 and sheath gas tube 13 using ferrules of different sizes. A flexible coil heater with an insulated surface (157.5 Ω, 27 inch long) was wrapped around the tubing. An adjustable transformer was used to supply power to the coil heater. Temperature was measured with a Cole-Parmer digital thermister thermometer (Model 810-20,Cole-Parmer Instrument Co., Vernon Hills, Ill.). The flexible thermister probe was wrapped under the coil heater. The distance between the tip of the capillary and the collector was 18 cm.

EXAMPLE 11

A prototype photochemical electrospinning device as shown in FIG. 6 (except as otherwise described below) was constructed by fusing a section of a disposable Pasteur pipette onto a stainless steel tube (0.065 inch O.D., 0.026 inch I.D., 4 inch long). The volume of the "bulb" was approximately 150 µl. The capillary following the bulb was 45 mm long and 1.4 mm O.D. Because the glass capillary was fragile, no coil heater or stainless steel tube for nitrogen gas was employed in the prototype.

The distance between the tip of the capillary and the collector was 18 cm. The device was placed inside a box (15 cm W×12 cm H×45 cm L) made of 10 mm thick transparent Plexiglas to reduce any high voltage hazard (which was small anyway, because the current was minute), and also to reduce the influence of stray airflow on the electrospinning process. The box may be placed horizontally, vertically, or at any other tilt angle. A reversible high voltage supply (Model ES30R0.1R/DAM) from Gamma High Voltage Research, Inc., Ormond Beach, Fla.) was used. This voltage supply could provide from 0 to about 30 kV potential, 100 µA current with reversible polarity. A syringe pump (Cole-Parmer model 74900-00, Cole-Parmer Instrument Co.) and a 5 ml glass syringe (Gastight #1005, Hamilton Co., Reno, Nev.) were used to deliver electrospinning solutions. (An ultrasonic generator was not available at the time the prototype experiments with this device were conducted.)

EXAMPLE 12

A poly (styrene-co-methyl methacrylate) or poly(styrene-methyl methacrylate) solution was synthesized as follows: All chemicals were ACS reagent grade and were purchased from Aldrich (Milwaukee, Wiss.). Isopropanol, xylene, styrene, methyl methacrylate, and methacrylic acid were freshly distilled. In a 20 ml scintillation vial, 7 ml isopropanol, 3 ml xylene, 5 ml styrene, 5 ml methyl methacrylate, 0.005 ml methacrylic acid, and 0.05 g 2,2'-azobisisobutyronitrile (a free radical initiator) were added and mixed under sonication. Nitrogen gas was passed through the solution (to remove oxygen) for 5 min, and the solution was sealed and degassed by sonication for 1 min. The solution was stirred magnetically, and was kept at 60°C. for 18 hours on a hotplate. The resulting solution was a clear, highly viscous solution, which presumptively contained 50% poly(styrene-MMA), 35% isopropanol, and 15% xylene. It was so viscous that it took about two minutes to draw 5 ml of the resulting solution into a syringe at room temperature. The solution was stored at 4° C. until used.

EXAMPLE 13

To begin optimizing the operating parameters, a series of electrospinning experiments was conducted using the synthesized poly(styrene-MMA) solution prepared as described above, using the electrospinning device as otherwise shown in FIG. 2, but with side port 17 blocked. A 40% poly(styrene-MMA) solution (synthesized polymer solution plus 20% isopropanol) was infused at 30 µl/min at room temperature. The viscous solution simply dropped from the tip of the capillary. Some large droplets reached the collector, and audible spikes were generated when the voltage approached the power supply's upper limit of 30 kV. Stable electrospinning conditions were not established. Then the temperature was raised to ~80° C. (The temperature fluctuated somewhat, depending on the flow rate, but could be stabilized using a means known in the art, such as a water jacket.). At ~80° C. the droplets became smaller and a sporadic electrospinning state appeared. Then a nitrogen sheath gas was introduced, while holding the temperature at ~80° C. The nitrogen flow rate was adjusted to establish stable electrospinning (or electrospray, if desired), as indicated by a Taylor cone at the tip of the capillary, a fine jet stream of solution, and a fine mist appearing on the collector (Al foil). The voltage was ~20 to ~25 kV, and the current ~5 to ~8 μA. The spun sample collected on the Al foil was dried at 80° C. in an oven for 15 min, gently rinsed with methanol, and dried again for 15 min. The dried sample was observed under a polarizing light microscope (Nikon Microphot-SA). Some fibers were observed, but most of the polymer was in the form of "beads"—droplets connected by fibers. Next, 2 mM tetrabutylammonium triflate (TBATFL) salt was added by mixing 1 ml of a 0.01M TBATFL-isopropanol solution with 4 ml synthesized polymer solution prior to electrospinning with nitrogen sheath flow at ~80° C. A SEM micrograph (not shown) of the spun sample showed that submicron polymer fibers (0.3~1.5 μm) were successfully produced.

EXAMPLE 14

Another electrospinning experiment as otherwise described in Example 13, but using a 20% poly(styrene-MMA)/2 mM TBATFL solution. A SEM micrograph of the resulting nanofibers (not shown) revealed that nanofibers of ~30 to ~300 nm diameter had been produced, though a small amount of elongated "beads" (~0.5 to ~1 μm wide, ~2 to ~3 μm long) were present.

EXAMPLE 15

Additional tests, otherwise similar to those in Examples 13 and 14, indicated that the gravitational orientation of the electrospinning device influenced the stability of the electrospinning process, and the morphology of the product. When the device was horizontal, a growing droplet at the capillary tip gradually forced the jet stream downwards, and eventually caused electrospinning to stop. On the other hand, positioning the device vertically would cause a significant amount of droplets and solution to collect with the fibers. A preferred orientation was to tilt the device between about 45 degrees and about 60 degrees from horizontal, which effectively separated the fibers from the droplets.

EXAMPLE 16

Reactive electrospinning in accordance with this invention may be used to fabricate cross-linked polymer nanofibers and submicron fibers. Cross-linked polymers may be fabricated by either of two general types of reactions. The first type is the reaction of a soluble liner polymer with pendent functional groups (e.g., alcohols, acids, aldehydes, acid chlorides, amides, and azides) with a cross-linker that contains two or more functional groups (e.g., alcohols, aldehydes, acid chlorides, and amines) that can react with the pendent functional groups in the linear polymer to form covalent bonds. Most hydrogels are formed by this type of reaction. Multivalent metal ions ($Ca^{+2}$, $Al^{+3}$, etc) may also be used as cross-linkers to form a so-called physical gel in which the cross-linking bonds are ionic or coordination bonds. Traditional electrospinning techniques may be used to form nanofibers with soluble linear polymers. Cross-linked nanofibers based this first type of reaction can may be formed either by reactive electrospinning for fast reactions, or by post-spinning treatment for slow reactions.

The second type of reaction to form cross-linked polymers is the copolymerization of monomers to form a linear polymer backbone with cross-linking monomers that have two or more polymerizable groups. Because monomers or oligomers will not form nanofibers by electrospinning, and because fully cross-linked polymers are generally insoluble, it has not previously been possible to prepare cross-linked polymer nanofibers. However, cross-linked polymer nanofibers may readily be fabricated by reactive electrospinning in accordance with the present invention. For example, nanofibers or submicron fibers of cross-linked vinyl-acrylic copolymers can be synthesized by the copolymerization of acrylic monomers, substituted vinyl monomers, and diacrylic or divinyl cross-linking monomers. A general reaction can be expressed as follows:

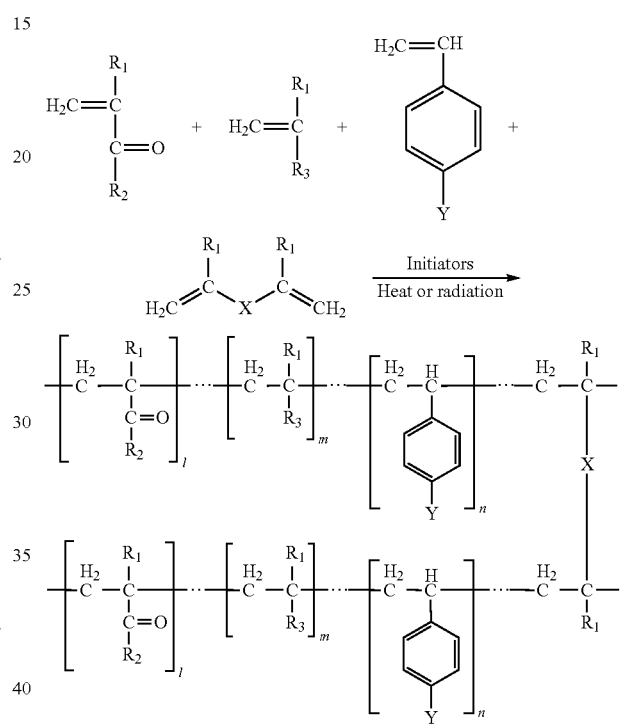

where $R_1$ is H, $CH_3$, Cl, or F; $R_2$ is H, OH, Cl, $NH_2$, $OCH_3$, or an ether group containing 2 to 12 carbons; $R_3$ is OH, Cl, F, CN, $OC(O)CH_3$, $OC(O)C_3H_7$, $NC(O)CH_2CH_2CH_2$ (pyrrolidone); Y is an aromatic group with one of the following structures:

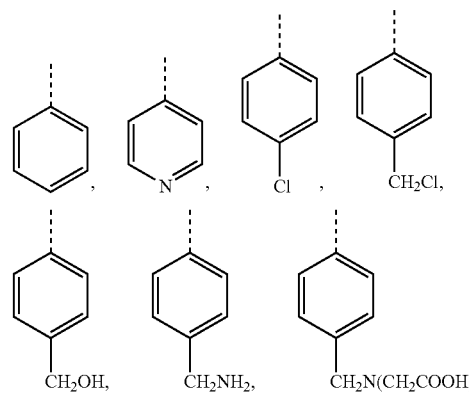

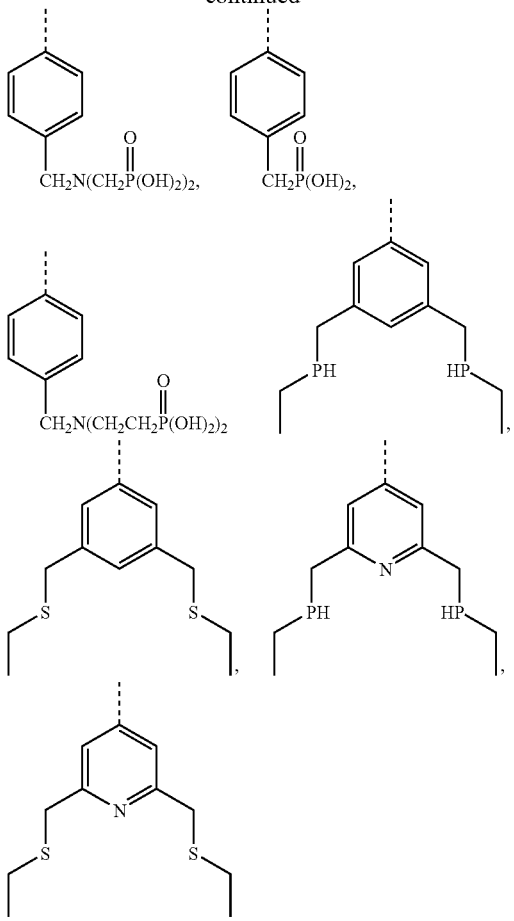

X is an aliphatic or aromatic group with one of the following structures:

where i is an integer from 1 to 6; I, m, and n are integers from 0 to 500 but at least one of them is 1.

In the reaction above, $R_1$ influences the reactivity of the monomer; $R_2$, $R_3$, and Ar determine the functionalities of the polymer; X affects the distance between the polymer chains, and thus physical properties such as swelling ability, rigidity, glass transition temperature, etc. Although some such cross-linked co-polymers have previously been prepared in bulk, in films, or as coatings, to the inventor's knowledge none has ever been prepared as sub-micron fibers or nanofibers. Such cross-linked nanofibers have advantages such as high relative surface area, high chemical and thermal stability, the ability to encompass a wide variety of functional groups, and the ability to selectively bond to certain metal ions, compounds, and biomolecules. They find wide applications in a wide variety of fields, including high efficiency filters, and absorbents, ion-exchangers, sensors, and protective clothing.

In a prototype demonstration of the fabrication of cross-linked polymer nanofibers, 8 g of poly(vinyl alcohol)(PVA) (Polysciences, Inc, 98 mol % hydrolyzed, Mw 78,000) was first dissolved in deionized water (92 ml) at 85° C. HCl (207.5 µl, 37% aq.) was then added to this 8 wt-% PVA solution at room temperature. Glutaric dialdehyde or glutaraldehyde (GLA) (Aldrich, 50 wt-% aq.) was diluted to 5 wt-% with deionized water. Upon mixing four parts of the 8 wt-% PVA solution with one part of the 5 wt-% GLA solution, the gel time, as determined from the viscosity-time curve, was found to be 18 minutes 45 seconds at room temperature, and 30 seconds at 50° C. Reactive electrospinning was then carried out at 50° C. using the device described in Example 4 and FIG. 5. The 8% PVA solution was injected at a flow rate of 1.2 ml/h through inlet 16, and the 5% GLA solution was injected at a flow rate of 0.395 ml/h through central tubing 21. The distance from the end of the central tubing to the end of the capillary $L_3'$ was 40 mm. According to Equation (7) in Example 4, the in-line reaction time was calculated as 31 seconds. Nitrogen gas (25 psi) was used as a sheath gas. The electrospun, cross-linked PVA hydrogel nanofibers were dried at 80° C. for two hours. A scanning electron micrograph (not shown) revealed that nanofibers with a diameter 195±72 nm (20 measurements) had been formed. The dried hydrogel nanofibers were then exposed to steam (95° C.) for 30 minutes, dried at 80° C. for two hours, and again observed by SEM (not shown). The morphology and size of the nanofibers were not significantly different from the original electrospun nanofibers, indicating the successful fabrication of cross-linked hydrogel nanofibers.

EXAMPLE 17

Cross-linked poly(methyl methacrylate-co-styrene-co-divinylbenzene) nanofibers were fabricated using a combination of chemical and photochemical reactive electrospinning as follows. Reagents were prepared as otherwise described in Example 12. A mixture was formed of 2.5 g (0.025 mol) methyl methacrylate (MAA), 2.6 g (0.025 mol) styrene, 0.163 g (0.001 mol) of divinylbenzene, and 0.053 g of 2,2'-aizobisisobutyronitrile (AIBN, 1 wt-% total monomers), in 6.8 ml (5.4g) mixed isopropanol and xylene (1:1, v/v) solvent containing 2 mM tetrabutylammonium triflate (TBATFL). The resulting solution contained 50 wt-% of mixed monomers, and 0.5 wt-% initiator. Nitrogen gas was passed through the solution for 10 min. to remove dissolved oxygen. The mixture was sealed and stirred at 70°C. for 1 hour 15 minutes to conduct free-radical polymerization off-line. Then 0.0185 g 1-phenyl-1,2-propane-dione (PPD, a photoinitiator) and 0.024g ethyl 4-dimethylaminobenzoate (EDAB, an accelerator) were added to the mixture. After the mixture had been stirred 10 min at room temperature, the viscosity was measured as about 4 cp. About 2 ml solution was withdrawn to make fibers by reactive electrospinning. To the remaining liquid (10.31 g) was added 18 ml (15.48 g) of the mixed solvent to make the monomer concentration in the mixture 20 wt-%. This new mixture was stirred at 70° C. to continue the polymerization reaction for another 4 hours and 4 minutes, after which the viscosity increased to 72 cp. Then the mixture was removed from heat and used for electrospinning.

The reactive electrospinning device was similar to that used in Example 16, except that the central tubing was removed and its fitting inlet was blocked. Additionally, a 275 W GE RSM UV Sunlamp was used to induce photochemical reactions. The UV lamp had an irradiating face diameter of 12 cm and a reflective back coating. The UV lamp was placed perpendicular to the capillary-collector axis. The edge of the lamp was 6.5 cm above the tip of the electrospinning capillary. The UV light simultaneously illuminated the capillary tip, the electrospinning jet stream, and the fibers on the collector. Reactive electrospinning was conducted at 80° C. at a flow rate of 1.2 ml/h and a nitrogen sheath gas (25 psi). The resulting fibers were cured with the UV light for additional 15 minutes, dried at 80°C. for one hour. An SEM micrograph (not shown) of the product from the 50 wt-% solution after two hours heating (off-line polymerization reaction) showed mostly droplets with a small number of nanofibers. An SEM micrograph (not shown) of the product from the 20 wt-% solution after 6 hours of off-line polymerization reaction showed mostly nanofibers, with diameters ranging from 35 nm to 529 nm, average diameter 193±144 nm (20 measurements). A small number of beads was still present. The size and morphology of the nanofibers did not change substantially upon immersion in an organic solvent such as methanol, acetone, or chloroform, and then drying. However a mixed xylene-isopropanol (1:1, v/v) solution did dissolve the nanofibers. Nevertheless, some nanofiber survived the xylene-isopropanol solvent, as seen by SEM. These results demonstrated that the nanofibers produced by reactive electrospinning were at least partially cross-linked. The cross-linking is optimized by steps such as more precise measurements of the gel point, matching absorption spectrum of photoinitiator to spectrum of UV light, and optimizing radiation power.

EXAMPLE 18

The novel electrospinning method and apparatus may also be used to form ceramic nanofibers by sol-gel electrospinning. In a prototype demonstration of this aspect of the invention, zirconia-based nanofibers were prepared by electrospinning. Dense $ZrO_2$—$Y_{2O3}$ and $ZrO_2$—$SiO_2$ nanofibers were prepared using a sol-gel procedure followed by electrospinning with minimum organic additive on a specially designed heated pneumatic electrospinning device. The resulting ceramic nanofibers were characterized by SEM, TEM, and XRD. The direct fabrication of ceramic precursor gel nanofibers by prior electrospinning techniques, without incorporating an organic polymer, has not previously been reported. In this embodiment of the present invention, the hydrolysis of an alkoxide and the polymerization of an inorganic precursor sol occur close to the gel point, as indicated by a sudden increase in viscosity. The so-gel transition takes place due to a dramatic increase in the sol-air interface and rapid solvent evaporation during the "time-of-flight" of an electrospun jet between the capillary and the collector. The sol-gel transition may be thought of as a form of crosslink polymerization reaction, one that produces a three-dimensional inorganic polymer network that is insoluble in most solvents. If the viscosity of the sol is too low, droplets and beads instead of straight fibers form due to the low degree of polymerization; while if the viscosity is too high (approaching the gel point), a steady electrospinning process is difficult to maintain without clogging the capillary. There is thus a relatively narrow window of opportunity to successfully produce nanofibers by electrospinning. The heated pneumatic electrospinning device and method of the present invention have been successfully used to fabricate dense yttria-zirconia and silica-zirconia nanofibers with minimum additives of organic polymer through reactive electrospinning process.

Zirconia-yttria sol was prepared by a modification of the procedure of Pullar, R. C.; Taylor, M. D; Bhaffacharya, A. K.; *J. of the Eur. Ceramic Soc.* 2001, 21, 19-27.

Zirconia so t: To zirconium (IV) propoxide solution in 1-propanol (Aldrich, 70 wt %, 0.1 mol, 46.80 g) in anhydrous 2-propanol (200 ml) was added dropwise a solution containing water (18 g, 1 mol), concentrated nitric acid (70.2 wt %, 0.1 mol), and anhydrous 2-propanol (50 ml). A gelatinous precipitate resulted. The mixture was concentrated to about 100 ml, and rediluted with 400 ml water. The concentration/redilution procedure was repeated twice, and the resulting mixture was filtered to give a yellow zirconia solution (about 100 ml).

Yttria sol: Yttrium nitrate (Aldrich, 25 mmol, 9.58 g) was dissolved in 100 ml water, and titrated to pH 9.5 with a 4% ammonia solution. The gelatinous precipitate was filtered, washed with deionized water (3×30 ml), and peptized with 0.5 M nitric acid (25 ml) for 12 hrs to form a milky yttria solution.

Silica sol: Phosphoric acid (85 wt %, 50 µl) was slowly dropped into a mixture of tetraethyl orthosilicate (7.5 g, Aldrich) and water (7.5 g). The resulting solution was vigorously stirred for 40 minutes at room temperature to obtain a colorless silica sol, which was immediately mixed with the zirconia solution described above, to prepare nanofibers as described below.

Ceramic nanofibers. A small amount (1 wt %) of polyethylene oxide (PEO, Aldrich, $M_w \cong 4 \times 10^5$) was added to both a mixed zirconia-yttria sol (molar ratio 92:8) and also to a mixed zirconia-silica sol (molar ratio 4:1), and both were then heated at 70° C. to concentrate the sols to the desired viscosity (~170 to ~3000 cP). The viscous solution was delivered to an electrospinning device as depicted in FIG. 5 with a syringe pump at a flow rate between about 2 and about 10 ml/hr. The device and capillary were heated to 80° C., and a coaxial nitrogen sheath gas (20 psi) was applied. A potential of 25 kV was applied between the capillary and the collector. Nanofibers were collected on a flat piece of aluminum foil positioned about 165 mm below the tip of the needle. The fibers were dried overnight at 110° C., and were then calcinated at 500° C. for 1 hour, 1000° C. for 2 hrs and 1200° C. for 1 hr. Both the as-spun nanofibers and the calcinated nanofibers were observed and photographed by scanning electron microscopy (SEM) and transmission electron microscopy (TEM). The calcinated ceramic nanofibers were also analyzed by X-ray diffraction (XRD).

The viscosity of zirconia-silica sol containing 1 wt % PEO at 70° C. changed slowly initially, but after about 4.5 hours increased sharply, indicating the approach of the gel point and the formation of a three-dimensional gel network. Viscosity is an important factor in the generation of gel fibers by electrospinning. Nanofibers could be electrospun from the sol at a viscosity between about 170 and about 3000 cP (i.e., after about 3.5 to 4.5 hours heating). Below 200cP, the principal product was droplets; and above 3000 cP the electrospinning process became less stable, and the capillary tended to clog. When the electrospinning capillary was not heated, fibers could only be generated in a narrow viscosity range (~1000 to ~2000cP), and electrospinning near the gel point was difficult to control. However, when the electrospinning capillary was heated to 80° C., sols with a wider range of viscosities could be used.

A core gas flow of nitrogen was used to enhance the electrospinning process, to split the solution jet into finer fibers. Without the sheath gas, neat gel fibers were generated only at lower flow rates (less than about 2 ml/hr). With coaxial nitrogen gas flow, the solution flow rate could be increased to about 10 ml/hr without significant formation of droplets.

Figure 11:
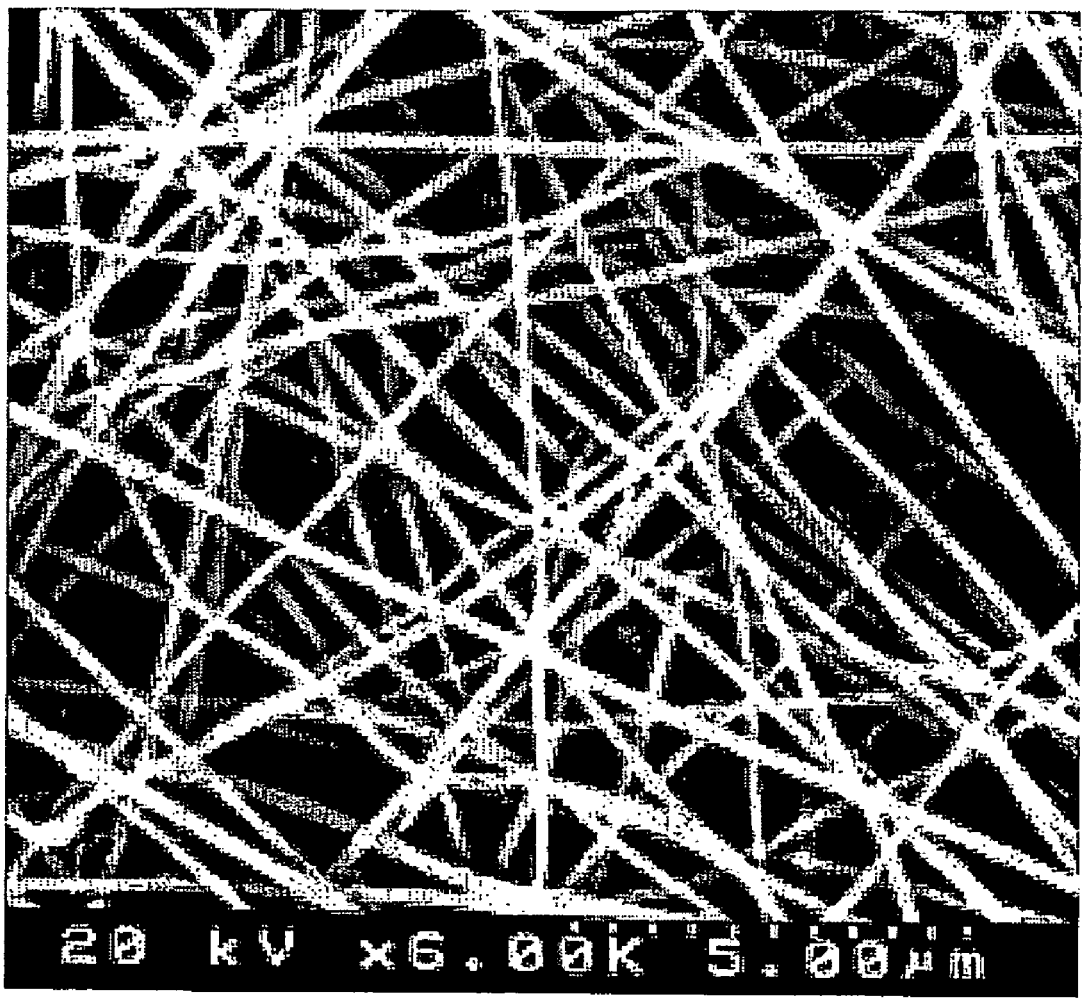
FIG. 11 depicts a scanning electron micrograph of a calcinated ceramic fiber prepared in accordance with this invention, comprising about 80% $ZrO_2$ and about 20% $SiO_2$.

SEM micrographs of electrospun gel fibers dried at 110° C. showed fibers having diameters in the range from about 200 nm to about 500 nm. For example, FIG. 11 depicts a scanning electron micrograph of a calcinated ceramic fiber prepared in accordance with this invention, comprising about 80% $ZrO_2$ and about 20% $SiO_2$. The diameters shrank to about 100 nm to about 300 nm following calcination. The fibers produced from a 80% $ZrO_2$+20% $SiO_2$ sol were thinner and denser than those from a 92% $ZrO_2$+8% $Y_2O_3$ sol. Adding $SiO_2$ to the $ZrO_2$ system appeared to enhance formation of three-dimensional gel network. Silica has the additional advantage that it assists in surface treatment using a silane coupling agent, to bond ceramic fibers to a polymer matrix to form a fiber-reinforced composite.

The calcinated ceramic nanofibers were also characterized using TEM. The TEM micrographs of 92% $ZrO_2$+8% $Y_2O_3$ ceramic fibers calcinated at 1000° C. (not shown) showed a slightly porous layer (~20 to ~40 nm) on top of a denser core (~120 to ~150 nm). After further calcination at 1200° C. for one hour, the fiber become denser and thinner (~100 to ~150 nm). However, some larger grains (~50 nm) had formed, and the surface of the fiber had become rougher. The particular conditions employed will depend on the tradeoff between smaller-diameter fibers and larger grain size and roughness, and may be optimized to fit the needs of a particular situation. Electron diffraction patterns (not shown) for the 92% $ZrO_2$+ 8% $Y_2O_3$ ceramic fiber calcinated at 1000° C. indicated that the fibers were crystalline.

A variety of zirconia-reinforced ceramic nanofibers or glass-ceramic nanofibers may be produced in a similar way changing the composition of the sol, or by adding other components to the sols. For example, adding alumina sol to a zirconia-yttria sol can produce zirconia-reinforced alumina nanofibers. Glass-forming or apatite-forming elements such as Na, B, Ca, P, Ti, and F can also be added in the form of sols, salts, or acids to a sol such as a zirconia-yttria sol or a zirconia-silica sol, or they may be added and mixed in the in-line reactor. Reactive electrospinning and calcination of such mixtures produces nanofibers of zirconia-reinforced bioactive glass-ceramics. Alternatively, the zirconia or other sol may be introduced through a central tubing, such as shown in FIG. 5 (with the end positioned at or near the level of the capillary tip); and the solution or sol containing glass-forming or apatite-forming compounds, organic polymers (PVA, PEO, etc.), or other materials may be introduced through the space between the central tubing and the electrospinning capillary. The coaxial reactive electrospinning of the two solutions can produce composite nanofibers, such as nanofibers with a zirconia core and a bioactive glass surface layer. Zirconia-reinforced bioactive glass-ceramics nanofibers will have significant higher strength and toughness than previously reported bioactive glass fibers or zirconia- or titania-particle-reinforced bioactive.

The reactions employed in reactive electrospinning may be any of a wide range of chemical reactions including the formation of new covalent bonds or coordination bonds, or the breaking of existing covalent bonds or coordination bonds. Although the chemical reactions and photochemical reactions and apparatus discussed above have primarily been those involved in polymerization or cross-linking reactions, the apparatus and methods described here may also be used in other types of reactions including, by way of example, hydrolysis, coordination, chelating, addition, replacement, condensation, rearrangement, oxidation, reduction, ionization, and decomposition. These reactions may be directed at modifying chemical structures and properties of polymers, attaching or removing functional groups, and the like. The novel process offers the advantage (over post-spinning processing) that the reactions occur in a homogeneous media, at least in their early stages.

Although the chemical reactions and photochemical reactions and apparatus discussed above have been primarily directed toward the production of nanofibers and submicron fibers by electrospinning, they may also be used for the production of nanodroplets and nanoparticles by electrospray. While the apparatus and methods would not require substantial modification, operating conditions might vary somewhat.

For example, in an otherwise similar method, using lower polymer concentration, or higher electrolyte concentration, or higher gas flow rate and pressure, or higher acoustic energy might be used to produce nanoparticles instead of fibers. A preferred collector for such an application would then be a bath of a nonsolvent liquid or a dispersant.

The complete disclosures of all references cited in the specification are hereby incorporated by reference. Also incorporated by reference is the complete disclosure of X. Xu et al., "Preparation of zirconia-based ceramics nanofibers by sol-gel electrospinning," *Polymeric Materials Science & Engineering*, vol. 91, pp. 517-518 (2004). In the event of an otherwise irreconcilable conflict, however, the present specification shall control.

What is claimed is:

1. A method for forming cross-linked polymer nanofibers or gel nanofibers by reactive electrospinning; said method comprising the steps of:
   (a) supplying one or more reagents to a reactor; and initiating a chemical reaction or a photochemical reaction of the one or more reagents within the reactor, within the Taylor cone of an electrospinning process, or in the jet of an electrospinning process; (i) wherein the reaction or photochemical reaction produces one or more of: a product with a substantially higher degree of crosslinking than the reagents, or a gel product from a sol-gel transition reaction mixture; and
   (ii) wherein the reaction mixture or photochemical reaction mixture would become too viscous to undergo electrospinning into nanofibers within about 30 minutes or sooner after the reaction is initiated;
   (b) electrospinning the reaction mixture onto a collector; wherein said electrospinning occurs before the reaction mixture becomes too viscous to undergo electrospinning into nanofibers; and
   (c) allowing the reaction to continue during electrospinning, or on the collector, or both; to produce cross-linked polymer nanofibers or gel nanofibers on the collector, wherein at least some of the nanofibers have a diameter less than about 5 µm.

2. A method as recited in claim 1, wherein said method is conducted as a batch process.

3. A method as recited in claim 1, wherein said method is conducted as a continuous process, without clogging of the capillary, for a time substantially greater than the time during which a batch reaction mixture would become too viscous to undergo electrospinning into nanofibers.

4. A method as recited in claim 1, wherein said electrospinning is enhanced by flowing a sheath of reactive or non-reactive gas around the reaction mixture exiting the capillary, or by flowing reactive or non-reactive gas through the core of the reaction mixture exiting the capillary, or both.

5. A method as recited in claim 1, additionally comprising the step of adding one or more reagents to the reaction mixture exiting a capillary from the reactor, to react chemically with the reaction mixture during electrospinning.

6. A method as recited in claim 1, wherein said electrospinning is enhanced by controlling the temperature of the reaction mixture in a capillary exiting the reactor.

7. A method as recited in claim 1, wherein said electrospinning is enhanced by adding one or more electrolytes to the reaction mixture.

8. A method as recited in claim 1, wherein the reaction is accelerated by applying ultrasound to the reaction mixture.

9. A method as recited in claim 1, wherein the reaction mixture would become too viscous to undergo electrospinning into nanofibers within about 10 minutes or sooner after the reaction is initiated.

10. A method as recited in claim 1, wherein the reaction mixture would become too viscous to undergo electrospinning into nanofibers within about 2 minutes or sooner after the reaction is initiated.

11. A method as recited in claim 1, wherein the reaction mixture would become too viscous to undergo electrospinning into nanofibers within about 30 seconds or sooner after the reaction is initiated.

12. A method as recited in claim 1, wherein the reaction mixture would become too viscous to undergo electrospinning into nanofibers within about 10 seconds or sooner after the reaction is initiated.

13. A method as recited in claim 1, wherein at least some of the nanofibers have a diameter less than about 1 µm.

14. A method as recited in claim 1, wherein at least some of the nanofibers have a diameter less than about 500 nm.

15. A method as recited in claim 1, wherein the nanofibers have a diameter less than about 1 µm; the nanofibers are at least about 50 µm long; and the nanofibers comprise at least about 10 mol-% $ZrO_2$.

16. A method as recited in claim 15, wherein the nanofibers are at least about 100 µm long.

17. A method as recited in claim 15, wherein the nanofibers additionally comprise at least one component selected from the group consisting of $Y_2O_3$, $Al_2O_3$, $SiO_2$, CaO, MgO, $TiO_2$, $P_2O_5$, $CaF_2$, $B_2O_3$, and $Na_2O$.

18. A method as recited in claim 17, wherein the nanofibers additionally comprise at least one component selected from the group consisting of $PO_3$, OH, F, N, and C.

19. A method as recited in claim 1, wherein
   a capillary receives the reaction mixture and extrudes the reaction mixture for electrospinning; and
   a high voltage source imposes an electrical potential between about 1 kilovolt and about 100 kilovolts between the collector and the capillary, to cause the reaction mixture to electrospin from the capillary to the collector.

20. A method as recited in claim 19,
   wherein a conduit causes a sheath of gas to flow around the reaction mixture exiting the capillary, or the conduit causes gas or one or more reagents to flow through the core of the reaction mixture exiting the capillary, or both.

21. A method as recited in claim 19, wherein an ultrasound transducer supplies ultrasound to the reaction mixture.

22. A method as recited in claim 19, wherein one or more light sources supply actinic radiation to the reaction mixture in the reactor, or during electrospinning between the capillary and the collector, or on the collector.

23. A method as recited in claim 19, wherein the collector collects the nanofibers continuously.

24. A method as recited in claim 19, wherein a high positive potential or a high negative potential is applied to the collector, and wherein the capillary is grounded.

25. A method as recited in claim 19, wherein a heater and a controller control the temperature of the capillary and the reactor.

26. A method as recited in claim 1, wherein the nanofibers produced by said method are ceramic oxide gel nanofibers; and wherein said method additionally comprises the step of calcining or sintering the ceramic oxide gel nanofibers.

27. A method as recited in claim 1, wherein the reactor is an in-line reactor, wherein the one or more reagents are supplied to the reactor through an in-line mixer, wherein a capillary extrudes the mixture for electrospinning, wherein a heater and a controller control the temperature of the reactor and the capillary, and wherein the reaction time is controlled by the flow rate of the reaction mixture and the volume of the in-line mixer.

28. A method as recited in claim 1, wherein at least some of the nanofibers have a diameter less than about 1μm; at least some of the nanofibers are at least about 50 μm long; and the nanofibers comprise a cross-linked polymer or a cross-linked copolymer or both; wherein the chemical reaction or photochemical reaction comprises:

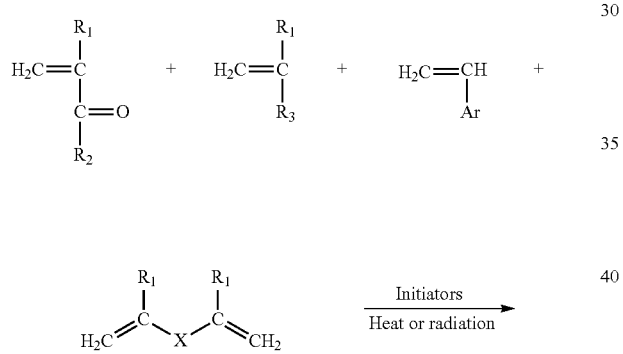

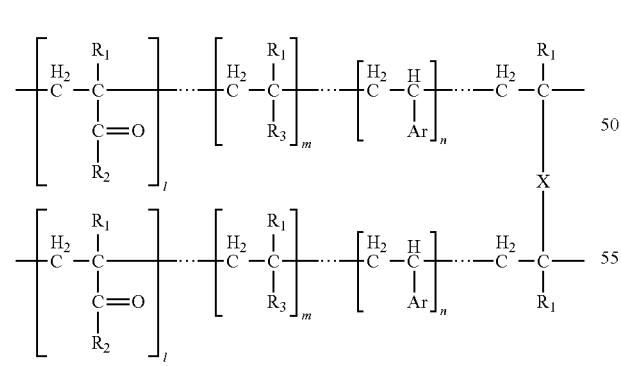

wherein $R_1$ is H, $CH_3$, Cl, or F; $R_2$ is H, OH, Cl, $NH_2$, $OCH_3$, or an ether group containing 2 to 12 carbons; $R_3$ is OH, Cl, F, CN, $OC(O)CH_3$, $OC(O)C_3H_7$, $NC(O)CH_2CH_2CH_2$ (pyrrolidone); Ar is an aromatic group with one of the following structures:

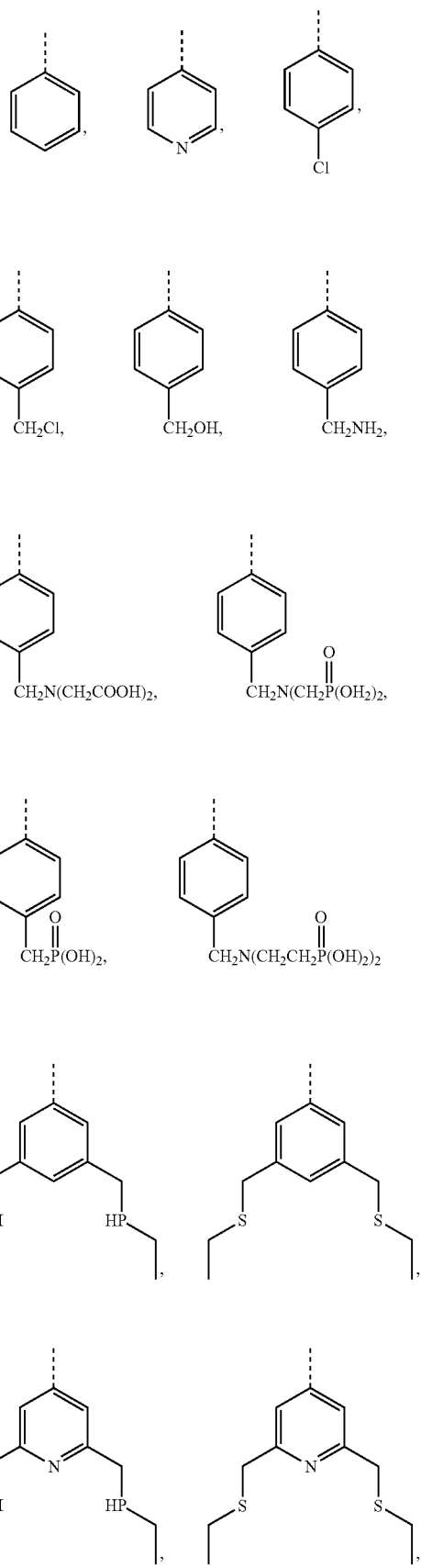

X is an aliphatic or aromatic group with one of the following structures:
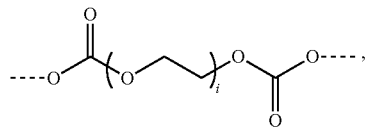
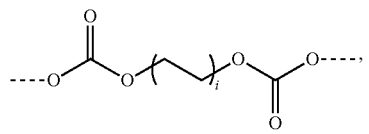
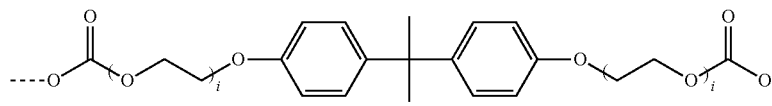
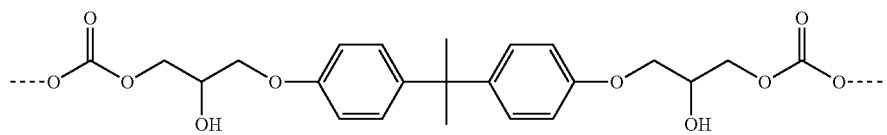
wherein i is an integer from 1 to 6; l, m, and n are integers from 0 to 500; and at least one of l, m, and n is 1.
* * * * *